US012573897B2

(12) United States Patent
Lin et al.

(10) Patent No.: US 12,573,897 B2
(45) Date of Patent: Mar. 10, 2026

(54) ROTOR, PERMANENT MAGNET MOTOR AND POWERTRAIN

(71) Applicant: HUAWEI DIGITAL POWER TECHNOLOGIES CO., LTD., Shenzhen (CN)

(72) Inventors: Yingqian Lin, Shanghai (CN); Yu Wang, Shenzhen (CN); Yi Sun, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 201 days.

(21) Appl. No.: 18/501,353

(22) Filed: Nov. 3, 2023

(65) Prior Publication Data

US 2024/0154477 A1　May 9, 2024

(30) Foreign Application Priority Data

Nov. 4, 2022　(CN) .......................... 202211379245.0

(51) Int. Cl.
H02K 1/276 (2022.01)

(52) U.S. Cl.
CPC .................................... H02K 1/276 (2013.01)

(58) Field of Classification Search
CPC .... H02K 1/276; H02K 29/03; H02K 2213/03; H02K 1/2766; Y02T 10/64
USPC ........................................ 310/156.53, 156.56
See application file for complete search history.

(56) References Cited

U.S. PATENT DOCUMENTS

| | | | | |
|---|---|---|---|---|
| 2013/0119807 A1* | 5/2013 | Nakada | ................ | H02K 1/2766 |
| | | | | 310/156.38 |
| 2016/0322872 A1* | 11/2016 | Takahashi | ............ | H02K 1/2766 |
| 2022/0069646 A1* | 3/2022 | Tang | .................... | H02K 1/2766 |

FOREIGN PATENT DOCUMENTS

| | | | |
|---|---|---|---|
| CN | 101820238 B | | 11/2012 |
| CN | 103166407 A | | 6/2013 |
| DE | 102012101822 A1 | | 10/2013 |
| DE | 102018220057 | * | 5/2020 |
| EP | 3657638 A1 | | 5/2020 |
| EP | 3610558 | * | 2/2021 |
| EP | 3610558 B1 | | 2/2021 |

OTHER PUBLICATIONS

Extended European Search Report in European Appln No. 23206224. 0, dated Apr. 2, 2024, 11 pages.

* cited by examiner

*Primary Examiner* — Ahmed Elnakib
(74) *Attorney, Agent, or Firm* — Fish & Richardson P.C.

(57) ABSTRACT

This application describes examples of a rotor, a permanent magnet motor and a powertrain. In one example, in a first rotor assembly of a rotor structure, each first rotor lamination is provided with a plurality of first permanent magnet slot groups, and a first boss is disposed at one end that is of each first permanent magnet slot of the first permanent magnet slot group and that is close to an outer edge of the first rotor lamination. In a second rotor assembly of the rotor structure, each second rotor lamination is provided with a plurality of second permanent magnet slot groups, and a second boss is disposed at one end that is of each second permanent magnet slot of the second permanent magnet slot group and that is close to an outer edge of the second rotor lamination.

20 Claims, 11 Drawing Sheets

100

112

110

120

100

112

110

130

120

ROTOR, PERMANENT MAGNET MOTOR AND POWERTRAIN

CROSS-REFERENCE TO RELATED APPLICATIONS

This application claims priority to Chinese Patent Application No. 202211379245.0, filed on Nov. 4, 2022, which is hereby incorporated by reference in its entirety.

TECHNICAL FIELD

Embodiments of this application relate to the field of flux motor technologies, and in particular, to a rotor, a permanent magnet motor and a powertrain.

BACKGROUND

A noise level in a vehicle is one of important indicators that affect driving comfort of the vehicle. A vehicle drive motor is a key execution component of an electric vehicle. Noise, vibration, and harshness (NVH) performance of the vehicle drive motor is critical to performance of the entire vehicle. In addition, with development of the electric vehicle, a requirement on NVH is increasingly strict. Electromagnetic noise is a major part of motor noise. To reduce overall noise of the motor, it is necessary to reduce the electromagnetic noise first. The most direct way to control the electromagnetic noise of the motor is to minimize noise excitation of the motor, that is, to minimize torque ripple of the motor.

In a related technology, a rotor of a permanent magnet motor mainly includes a rotor core and a plurality of rotor magnetic poles. Specifically, the rotor magnetic poles are distributed on a periphery of the rotor core in a circumferential direction of the rotor core. In addition, in a radial direction of the rotor core, adjacent rotor magnetic poles are slightly staggered. Included angles between the rotor magnetic poles are different from each other. This implements better NVH effect.

However, in the foregoing solution, an overall process difficulty of the rotor is high, and consequently production efficiency of the permanent magnet motor is low.

SUMMARY

Embodiments of this application provide a rotor, a permanent magnet motor, a powertrain, and a vehicle, to optimize NVH performance of the permanent magnet motor, and avoid a problem that an overall process difficulty of the rotor is high, and consequently production efficiency of the permanent magnet motor is low.

According to a first aspect, an embodiment of this application provides a rotor. The rotor includes at least two rotor assemblies disposed coaxially. The at least two rotor assemblies include a first rotor assembly and a second rotor assembly that is attached to the first rotor assembly.

The first rotor assembly includes at least a plurality of first rotor laminations stacked in an axial direction of the rotor. Each first rotor lamination is provided with a plurality of first permanent magnet slot groups. The plurality of first permanent magnet slot groups are evenly arranged in a circumferential direction of each first rotor lamination. Each first permanent magnet slot group includes at least one first permanent magnet slot. A first permanent magnet is disposed in each first permanent magnet slot. A first boss is disposed at one end that is of each first permanent magnet slot and that is close to an outer edge of the first rotor lamination.

The second rotor assembly includes at least a plurality of second rotor laminations stacked in the axial direction of the rotor. Each second rotor lamination is provided with a plurality of second permanent magnet slot groups. The plurality of second permanent magnet slot groups are evenly arranged in a circumferential direction of each second rotor lamination. Each second permanent magnet slot group includes at least one second permanent magnet slot. A second permanent magnet is disposed in each second permanent magnet slot. A second boss is disposed at one end that is of each second permanent magnet slot and that is close to an outer edge of the second rotor lamination.

In the axial direction of the rotor, the first permanent magnet slot and the second permanent magnet slot that are in a same corresponding location communicate with each other.

According to the rotor provided in this embodiment of this application, in the rotor, the first rotor assembly and the second rotor assembly use an axial combination structure. A magnetic field offset between the first rotor assembly and the second rotor assembly can be implemented by using the first bosses in the first rotor laminations and the second bosses in the second rotor laminations, so that a torque between the first rotor assembly and the second rotor assembly is reduced. In addition, the first permanent magnet slot and the second permanent magnet slot that are in the same corresponding location communicate with each other in the axial direction of the rotor, so that injection molding pressure of the rotor can be greatly reduced. In this way, NVH performance of the permanent magnet motor can be optimized, a production process can be simplified, and therefore a problem that an overall process difficulty of the rotor is high, and consequently production efficiency of the permanent magnet motor is low can be avoided. This can facilitate mass production of the rotor and the permanent magnet motor.

In a possible implementation, in the same corresponding location in the axial direction of the rotor, one end of the first boss is connected to the first permanent magnet slot, the other end of the first boss extends in a clockwise direction of the first rotor lamination, one end of the second boss is connected to the second permanent magnet slot, and the other end of the second boss extends in an anticlockwise direction of the second rotor lamination; or in the same corresponding location in the axial direction of the rotor, one end of the first boss is connected to the first permanent magnet slot, the other end of the first boss extends in an anticlockwise direction of the first rotor lamination, one end of the second boss is connected to the second permanent magnet slot, and the other end of the second boss extends in a clockwise direction of the second rotor lamination.

The extension direction of the first boss in the first rotor lamination is different from the extension direction of the second boss in the second rotor lamination, so that the magnetic field offset between the first rotor assembly and the second rotor assembly can be better implemented, and the torque between the first rotor assembly and the second rotor assembly can be reduced to a greater extent.

In a possible implementation, in the same corresponding location in the axial direction of the rotor, a central angle of the first boss is the same as a central angle of the second boss. When the central angle of the first boss of the first rotor lamination corresponds to the central angle of the second boss of the second rotor lamination, a problem of inconsistency between forward rotation performance and reversal rotation performance of the rotor can be avoided, so that a problem of inconsistency between forward rotation performance and reversal rotation performance of the permanent magnet motor in a working process can be avoided, and overall reliability of the permanent magnet motor can be improved or ensured.

In a possible implementation, each first permanent magnet slot includes a first main slot body, a first flux barrier, and a second flux barrier. One end of the first main slot body is connected to the first flux barrier. The other end of the first main slot body is connected to the second flux barrier. The first main slot body is configured to accommodate the first permanent magnet. The first boss is disposed at one end that is of the second flux barrier and that is close to the outer edge of the first rotor lamination. Each second permanent magnet slot includes a second main slot body, a third flux barrier, and a fourth flux barrier. One end of the second main slot body is connected to the third flux barrier. The other end of the second main slot body is connected to the fourth flux barrier. The second main slot body is configured to accommodate the second permanent magnet. The second boss is disposed at one end that is of the fourth flux barrier and that is close to the outer edge of the second rotor lamination.

An orthographic projection of the first main slot body in the axial direction of the rotor and an orthographic projection of the second main slot body in the axial direction of the rotor overlap with each other. The first flux barrier and the third flux barrier communicate with each other in the axial direction of the rotor. The second flux barrier and the fourth flux barrier communicate with each other in the axial direction of the rotor.

The first permanent magnet slot in the first rotor lamination is designed to include the first main slot body, the first flux barrier, and the second flux barrier that are connected to one another. The second permanent magnet slot in the second rotor lamination is designed to include the second main slot body, the third flux barrier, and the fourth flux barrier that are connected to one another. The first main slot body is configured to accommodate the first permanent magnet. The second main slot body is configured to accommodate the second permanent magnet. The orthographic projection of the first main slot body in the axial direction of the rotor and the orthographic projection of the second main slot body in the axial direction of the rotor overlap with each other. Therefore, it can be ensured that an orthographic projection of the first permanent magnet in the axial direction of the rotor and an orthographic projection of the second permanent magnet in the axial direction of the rotor overlap with each other. Locations of permanent magnets that correspond in the axial direction of the rotor are consistent, so that magnetic steel insertion and magnetizing processes can be smoothly implemented. In addition, the first flux barrier and the third flux barrier communicate with each other in the axial direction of the rotor, and the second flux barrier and the fourth flux barrier communicate with each other in the axial direction of the rotor. Therefore, it can be ensured that a tail end of the first permanent magnet slot and a tail end of the second permanent magnet slot keep communicating with each other in the axial direction of the rotor, so that injection molding pressure of the rotor can be greatly reduced.

In a possible implementation, the first permanent magnet and the second permanent magnet that correspond to each other in the axial direction of the rotor are the same. The first permanent magnet and the second permanent magnet that are corresponding to each other in the axial direction of the rotor are the same. For example, the first permanent magnet and the second permanent magnet are consistent in size and material, so that magnetic steel materials can be centralized ly managed, and magnetic steel insertion and magnetizing processes are smoothly implemented.

In a possible implementation, each first permanent magnet slot group includes one first permanent magnet slot. A plurality of first permanent magnet slots in the first permanent magnet slot groups are evenly arranged in the circumferential direction of the first rotor lamination. Each second permanent magnet slot group includes one second permanent magnet slot. A plurality of second permanent magnet slots in the plurality of second permanent magnet slot groups are evenly arranged in the circumferential direction of the second rotor lamination.

In a possible implementation, each first permanent magnet slot group includes two first permanent magnet slots. The two first permanent magnet slots are symmetrically distributed in a radial direction of the first rotor lamination. Each second permanent magnet slot group includes two second permanent magnet slots. The two second permanent magnet slots are symmetrically distributed in a radial direction of the second rotor lamination.

In a possible implementation, the two first permanent magnet slots are distributed in a V shape in the radial direction of the first rotor lamination. The two second permanent magnet slots are distributed in a V shape in the radial direction of the second rotor lamination.

In a possible implementation, one end of one of the two first permanent magnet slots is close to one end of the other of the two first permanent magnet slots. The other end of one of the two first permanent magnet slots is far away from the other end of the other of the two first permanent magnet slots. The first boss is disposed at one end that is of each of the two first permanent magnet slots and that is close to the outer edge of the first rotor lamination.

One end of one of the two second permanent magnet slots is close to one end of the other of the two second permanent magnet slots. The other end of one of the two second permanent magnet slots is far away from the other end of the other of the two second permanent magnet slots. The second boss is disposed at one end that is of each of the two second permanent magnet slots and that is close to the outer edge of the second rotor lamination.

In a possible implementation, each first permanent magnet slot group includes three first permanent magnet slots. Two of the three first permanent magnet slots are symmetrically distributed in a radial direction of the first rotor lamination. The other one of the three first permanent magnet slots is located between the two first permanent magnet slots.

Each second permanent magnet slot group includes three second permanent magnet slots. Two of the three second permanent magnet slots are symmetrically distributed in a radial direction of the second rotor lamination. The other one of the three second permanent magnet slots is located between the two second permanent magnet slots.

In a possible implementation, two of the three first permanent magnet slots are distributed in a V shape in the radial direction of the first rotor lamination. The other one of the three first permanent magnet slots is located between the two first permanent magnet slots.

Two of the three second permanent magnet slots are distributed in a V shape in the radial direction of the second rotor lamination. The other one of the three second permanent magnet slots is located between the two second permanent magnet slots.

In a possible implementation, each first permanent magnet slot group includes four first permanent magnet slots. Two of the four first permanent magnet slots are symmetrically distributed in a radial direction of the first rotor lamination. The other two of the four first permanent magnet slots are symmetrically distributed in the radial direction of the first rotor lamination.

Each second permanent magnet slot group includes four second permanent magnet slots. Two of the four second permanent magnet slots are symmetrically distributed in a radial direction of the second rotor lamination. The other two of the four second permanent magnet slots are symmetrically distributed in the radial direction of the second rotor lamination.

In a possible implementation, two of the four first permanent magnet slots are distributed in a V shape in the radial direction of the first rotor lamination. The other two of the four first permanent magnet slots are distributed in a V shape in the radial direction of the first rotor lamination.

Two of the four second permanent magnet slots are distributed in a V shape in the radial direction of the second rotor lamination. The other two of the four second permanent magnet slots are distributed in a V shape in the radial direction of the second rotor lamination.

In a possible implementation, two of the four first permanent magnet slots are a first V-shaped slot group. One end of one first permanent magnet slot in the first V-shaped slot group is close to one end of the other first permanent magnet slot in the first V-shaped slot group. The other end of one first permanent magnet slot in the two first V-shaped slot groups is far away from the other end of the other first permanent magnet slot in the two first V-shaped slot groups. The first boss is disposed at one end that is of each of the two first permanent magnet slots in the first V-shaped slot group and that is close to the outer edge of the first rotor lamination.

The other two of the four first permanent magnet slots are a second V-shaped slot group. One end of one first permanent magnet slot in the second V-shaped slot group is close to one end of the other first permanent magnet slot in the second V-shaped slot group. The other end of one first permanent magnet slot in the two second V-shaped slot groups is far away from the other end of the other first permanent magnet slot in the two second V-shaped slot groups. The first boss is disposed at one end that is of each of the two first permanent magnet slots in the second V-shaped slot group and that is close to the outer edge of the first rotor lamination. The first V-shaped slot group is located on an inner side of the second V-shaped slot group.

Two of the four second permanent magnet slots are a third V-shaped slot group. One end of one second permanent magnet slot in the third V-shaped slot group is close to one end of the other second permanent magnet slot in the third V-shaped slot group. The other end of one second permanent magnet slot in the two third V-shaped slot groups is far away from the other end of the other second permanent magnet slot in the two third V-shaped slot groups. The second boss is disposed at one end that is of each of the two second permanent magnet slots in the third V-shaped slot group and that is close to the outer edge of the second rotor lamination.

The other two of the four second permanent magnet slots are a fourth V-shaped slot group. One end of one second permanent magnet slot in the fourth V-shaped slot group is close to one end of the other second permanent magnet slot in the fourth V-shaped slot group. The other end of one second permanent magnet slot in the two fourth V-shaped slot groups is far away from the other end of the other second permanent magnet slot in the two fourth V-shaped slot groups. The second boss is disposed at one end that is of each of the two second permanent magnet slots in the fourth V-shaped slot group and that is close to the outer edge of the second rotor lamination. The third V-shaped slot group is located on an inner side of the fourth V-shaped slot group.

In a possible implementation, the at least two rotor assemblies further include a third rotor assembly. The third rotor assembly is located between the first rotor assembly and the second rotor assembly. The third rotor assembly is attached to the first rotor assembly and the second rotor assembly. The third rotor assembly includes at least a plurality of third rotor laminations stacked in the axial direction of the rotor. Each third rotor lamination is provided with a plurality of third permanent magnet slot groups. The plurality of third permanent magnet slot groups are evenly arranged in a circumferential direction of each third rotor lamination. Each third permanent magnet slot group includes at least one third permanent magnet slot. A third permanent magnet is disposed in each third permanent magnet slot. In the axial direction of the rotor, the third permanent magnet slot, the first permanent magnet slot, and the second permanent magnet slot that are in a same corresponding location communicate with one another.

The third rotor assembly is disposed in the rotor. The third rotor assembly is disposed coaxial with the first rotor assembly and the second rotor assembly. The third rotor assembly includes at least a plurality of third rotor laminations stacked in the axial direction of the rotor. Each third rotor lamination is provided with a plurality of third permanent magnet slot groups evenly arranged in a circumferential direction of the third rotor lamination. Each third permanent magnet slot group includes at least one third permanent magnet slot configured to accommodate the third permanent magnet. In this way, a design dimension of the rotor can be added based on the first rotor assembly and the second rotor assembly.

In a possible implementation, each third permanent magnet slot includes a third main slot body, a fifth flux barrier, and a sixth flux barrier. One end of the third main slot body is connected to the fifth flux barrier. The other end of the third main slot body is connected to the sixth flux barrier. The third main slot body is configured to accommodate the third permanent magnet. An orthographic projection of the third main slot body in the axial direction of the rotor, the orthographic projection of the first main slot body in the axial direction of the rotor, and the orthographic projection of the second main slot body in the axial direction of the rotor overlap with one another. The fifth flux barrier, the first flux barrier, and the third flux barrier communicate with one another in the axial direction of the rotor. The sixth flux barrier, the second flux barrier, and the fourth flux barrier communicate with one another in the axial direction of the rotor.

The third permanent magnet slot in the third rotor lamination is designed to include the third main slot body, the fifth flux barrier, and the sixth flux barrier that are connected to one another. The third main slot body is configured to accommodate the third permanent magnet. The orthographic projection of the third main slot body in the axial direction of the rotor, the orthographic projection of the first main slot body in the axial direction of the rotor, and the orthographic projection of the second main slot body in the axial direction of the rotor overlap with one another. Therefore, it can be ensured that an orthographic projection of the third permanent magnet in the axial direction of the rotor, an orthographic projection of the first permanent magnet in the axial direction of the rotor, and an orthographic projection of the second permanent magnet in the axial direction of the rotor overlap with one another. Locations of permanent magnets that correspond in the axial direction of the rotor are consistent, so that magnetic steel insertion and magnetizing processes can be smoothly implemented. In addition, the fifth flux barrier, the first flux barrier, and the third flux barrier communicate with one another in the axial direction of the rotor, and the sixth flux barrier, the second flux barrier, and the fourth flux barrier communicate with one another in the axial direction of the rotor. Therefore, it can be ensured that a tail end of the third permanent magnet slot, a tail end of the first permanent magnet slot, a tail end of the second permanent magnet slot keep communicating with one another in the axial direction of the rotor, so that injection molding pressure of the rotor can be greatly reduced.

In a possible implementation, the first permanent magnet, the second permanent magnet, and the third permanent magnet that correspond to one another in the axial direction of the rotor are the same. The first permanent magnet, the second permanent magnet, and the third permanent magnet that are corresponding to one another in the axial direction of the rotor are the same. For example, the first permanent magnet, the second permanent magnet, and the third permanent magnet are consistent in size and material, so that magnetic steel materials can be centralized managed, and magnetic steel insertion and magnetizing processes are smoothly implemented.

In a possible implementation, each third permanent magnet slot group includes one third permanent magnet slot. A plurality of third permanent magnet slots in the plurality of third permanent magnet slot groups are evenly arranged in the circumferential direction of the third rotor lamination.

In a possible implementation, each third permanent magnet slot group includes two third permanent magnet slots. The two third permanent magnet slots are symmetrically distributed in a radial direction of the third rotor lamination.

In a possible implementation, the two third permanent magnet slots are distributed in a V shape in the radial direction of the third rotor lamination.

In a possible implementation, one end of one of the two third permanent magnet slots is close to one end of the other of the two third permanent magnet slots. The other end of one of the two third permanent magnet slots is far away from the other end of the other of the two third permanent magnet slots.

In a possible implementation, each first permanent magnet slot group includes three third permanent magnet slots. Two of the three third permanent magnet slots are symmetrically distributed in a radial direction of the third rotor lamination. The other one of the three third permanent magnet slots is located between the two third permanent magnet slots.

In a possible implementation, each third permanent magnet slot group includes four third permanent magnet slots. Two of the four third permanent magnet slots are symmetrically distributed in a radial direction of the third rotor lamination. The other two of the four third permanent magnet slots are symmetrically distributed in the radial direction of the third rotor lamination.

In a possible implementation, two of the four third permanent magnet slots are distributed in a V shape in the radial direction of the third rotor lamination. The other two of the four third permanent magnet slots are distributed in a V shape in the radial direction of the third rotor lamination.

In a possible implementation, two of the four third permanent magnet slots are a fifth V-shaped slot group. One end of one third permanent magnet slot in the fifth V-shaped slot group is close to one end of the other third permanent magnet slot in the fifth V-shaped slot group. The other end of one third permanent magnet slot in the two fifth V-shaped slot groups is far away from the other end of the other third permanent magnet slot in the two fifth V-shaped slot groups.

The other two of the four first permanent magnet slots are a sixth V-shaped slot group. One end of one third permanent magnet slot in the sixth V-shaped slot group is close to one end of the other third permanent magnet slot in the sixth V-shaped slot group. The other end of one third permanent magnet slot in the two sixth V-shaped slot groups is far away from the other end of the other third permanent magnet slot in the two sixth V-shaped slot groups. The fifth V-shaped slot group is located on an inner side of the sixth V-shaped slot group.

According to a second aspect, an embodiment of this application provides a permanent magnet motor. The permanent magnet motor includes at least one stator structure and at least one rotor according to any one of the foregoing descriptions. The stator structure and the rotor are alternately arranged in an axial direction of the permanent magnet motor.

According to the permanent magnet motor provided in this embodiment of this application, the permanent magnet motor includes the rotor. In the rotor, a first rotor assembly and a second rotor assembly use an axial combination structure. A magnetic field offset between the first rotor assembly and the second rotor assembly can be implemented by using first bosses in first rotor laminations and second bosses in second rotor laminations, so that a torque between the first rotor assembly and the second rotor assembly is reduced. In this way, NVH performance of the permanent magnet motor can be optimized, a production process can be simplified, and therefore a problem that an overall process difficulty of the rotor is high, and consequently production efficiency of the permanent magnet motor is low can be avoided. This can facilitate mass production of the rotor and the permanent magnet motor.

The rotor is disposed in the permanent magnet motor. Because a process difficulty of the rotor in the permanent magnet motor is small, a process difficulty of the permanent magnet motor is small, and production efficiency is high. In this way, mass production of the permanent magnet motor can be improved, and use performance of the permanent magnet motor can be optimized.

According to a third aspect, an embodiment of this application provides a powertrain. The powertrain includes the foregoing permanent magnet motor.

According to the powertrain provided in this embodiment of this application, the powertrain includes at least the permanent magnet motor, and the permanent magnet motor includes at least a rotor. In the rotor, a first rotor assembly and a second rotor assembly use an axial combination structure. A magnetic field offset between the first rotor assembly and the second rotor assembly can be implemented by using first bosses in first rotor laminations and second bosses in second rotor laminations, so that a torque between the first rotor assembly and the second rotor assembly is reduced. In this way, NVH performance of the permanent magnet motor can be optimized, a production process can be simplified, and therefore a problem that an overall process difficulty of the rotor is high, and consequently production efficiency of the permanent magnet motor is low can be avoided. This can facilitate mass production of the rotor and the permanent magnet motor.

The permanent magnet motor is disposed in the powertrain. Because a process difficulty of the rotor in the permanent magnet motor is small, a process difficulty of the permanent magnet motor is small, and production efficiency is high. Therefore, overall performance of the powertrain can be optimized.

According to a fourth aspect, an embodiment of this application provides a vehicle. The vehicle includes at least front wheels, rear wheels, a vehicle body, and the foregoing permanent magnet motor. The vehicle body is connected between the front wheels and the rear wheels. The permanent magnet motor is installed on the vehicle body.

According to the vehicle provided in this embodiment of this application, the vehicle includes at least the permanent magnet motor, and the permanent magnet motor includes at least a rotor. In the rotor, a first rotor assembly and a second rotor assembly use an axial combination structure. A magnetic field offset between the first rotor assembly and the second rotor assembly can be implemented by using first bosses in first rotor laminations and second bosses in second rotor laminations, so that a torque between the first rotor assembly and the second rotor assembly is reduced. In this way, NVH performance of the permanent magnet motor can be optimized, a production process can be simplified, and therefore a problem that an overall process difficulty of the rotor is high, and consequently production efficiency of the permanent magnet motor is low can be avoided. This can facilitate mass production of the rotor and the permanent magnet motor.

The permanent magnet motor is disposed in the vehicle. Because a process difficulty of the rotor in the permanent magnet motor is low, a process difficulty of the permanent magnet motor is small, and production efficiency is high. Therefore, the vehicle has a small process difficulty and high production efficiency. In this way, use performance and safety of the vehicle can be optimized.

10

Figure 10:
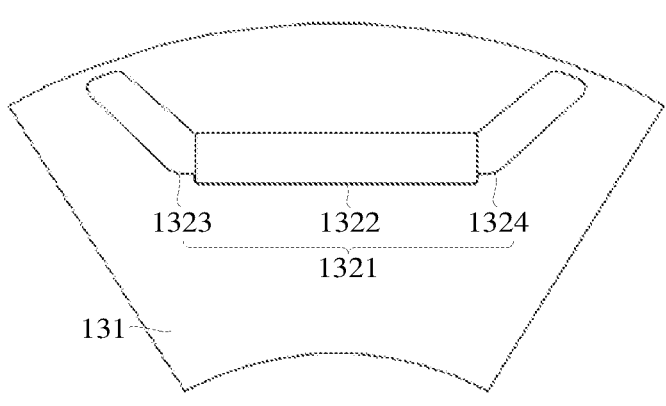
Figure 11:
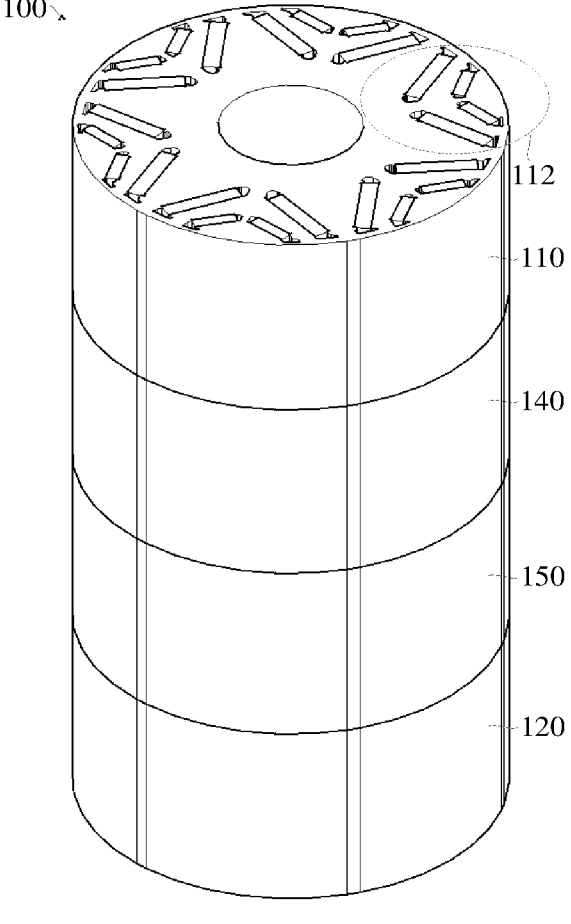

FIG. 10 is a schematic diagram of a partial structure of a third rotor lamination in a third rotor assembly of a rotor according to an embodiment of this application; and FIG. 11 is a schematic diagram of an overall structure of a rotor according to an embodiment of this application.

DESCRIPTIONS OF REFERENCE NUMERALS

100: Rotor; 110: First rotor assembly; 111: First rotor lamination;
112: First permanent magnet slot group; 1121: First permanent magnet slot; 1122: First main slot body;
1123: First flux barrier; 1124: Second flux barrier; 113: First permanent magnet;
114: First boss; 115: First V-shaped slot group; 116: Second V-shaped slot group;
120: Second rotor assembly; 121: Second rotor lamination; 122: Second permanent magnet slot group;
1221: Second permanent magnet slot; 1222: Second main slot body; 1223: Third flux barrier;
1224: Fourth flux barrier; 123: Second permanent magnet; 124: Second boss;
125: Third V-shaped slot group; 126: Fourth V-shaped slot group; 130: Third rotor assembly;
131: Third rotor lamination; 132: Third permanent magnet slot group; 1321: Third permanent magnet slot;
1322: Third main slot body; 1323: Fifth flux barrier; 1324: Sixth flux barrier;
133: Third permanent magnet; 134: Fifth V-shaped slot group; 135: Sixth V-shaped slot group;
140: Fourth rotor assembly; 150: Fifth rotor assembly; A: First preset included angle;
B: Second preset included angle.

DESCRIPTION OF EMBODIMENTS

Terms used in implementations of this application are merely used to explain specific embodiments of this application, but are not intended to limit this application. The following describes implementations of embodiments of this application in detail with reference to the accompanying drawings.

An electric motor (namely, a motor) generally generates a torque to convert electric energy into mechanical power. The electric motor such as an induction motor and a permanent magnet motor is used to drive an electric vehicle (including a hybrid vehicle), and captures braking energy when being used as a generator. Generally, the electric motor includes a rotor that rotates during operation and a stator that is stationary during operation. The rotor may include a plurality of permanent magnets, and rotates relative to the stationary stator. The rotor is connected to a rotor shaft, and the rotor shaft rotates along with the rotor. The rotor that includes the permanent magnets is separated from the stator by a predetermined air gap. The stator includes a conductor in a form of a wire winding. When electric energy is applied through the wire winding, a magnetic field is generated. When electric energy or power is fed into the wire winding of the stator, the power can be transferred through a magnetic flux in the air gap, to generate a torque acting on the permanent magnets in the rotor. In this way, mechanical power can be transferred to the rotating rotor shaft or extracted from the rotating rotor shaft. In the electric vehicle, the rotor thus transfers the torque to driving wheels of the vehicle through a gear set and the rotating shaft.

Currently, two common types of motors include a radial flux motor and a permanent magnet motor. In the radial flux motor, a rotor and a stator are usually located in a concentric structure or an embedded structure. Therefore, when the stator is electrified, the stator generates a magnetic flux that extends radially from the stator to the rotor. Therefore, a wire winding in the stator is generally arranged perpendicular to a rotation axis, to generate a magnetic field that is radially oriented along the rotation axis (along a rotor shaft). In the permanent magnet motor, a magnetic field parallel to a rotation axis is generated by a wire winding in a stator. Therefore, a flux extends parallel to the rotation axis (parallel to a rotor shaft). In some applications, the permanent magnet motor is ideal. Compared with the radial flux motor, the permanent magnet motor is lighter, generates increased power, and has a compact size. Therefore, in an application scenario with a limitation requirement such as a requirement on a size and a weight, for example, during application of an electric vehicle driving motor, the permanent magnet motor has an obvious application advantage over the radial flux motor at a same rotation speed.

In a related technology, a rotor of a permanent magnet motor mainly includes a rotor core and a plurality of rotor magnetic poles. Specifically, the rotor magnetic poles are distributed on a periphery of the rotor core in a circumferential direction of the rotor core. In addition, in a radial direction of the rotor core, adjacent rotor magnetic poles are slightly staggered. Included angles between the rotor magnetic poles are different from each other. This implements better NVH effect.

However, in the foregoing solution, an overall process difficulty of the rotor is high, and consequently production efficiency of the permanent magnet motor is low.

Based on this, embodiments of this application provide a new rotor and a permanent magnet motor having the rotor. The permanent magnet motor having the rotor may be applied to a vehicle, to resolve the foregoing technical problem.

With reference to the accompanying drawings, the following describes in detail a specific structure of the rotor and the permanent magnet motor having the rotor by using different embodiments as examples.

Figure 1A:
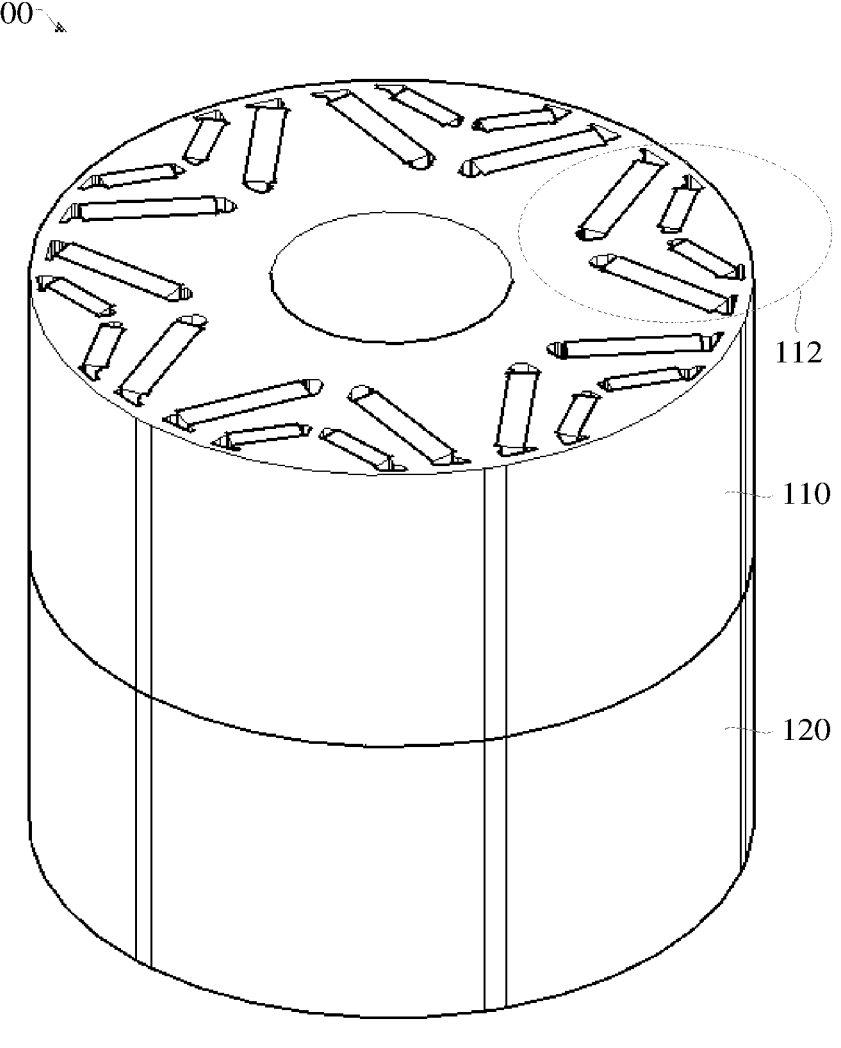
FIG. 1A is a schematic diagram of an overall structure of a rotor according to an embodiment of this application.

As shown in FIG. 1A, an embodiment of this application provides a rotor 100. The rotor 100 may be applied to a permanent magnet motor. Specifically, the rotor 100 may include at least two rotor assemblies disposed coaxially. The at least two rotor assemblies may include at least a first rotor assembly 110 and a second rotor assembly 120. The first rotor assembly 110 is attached to the second rotor assembly 120.

Figure 1B:
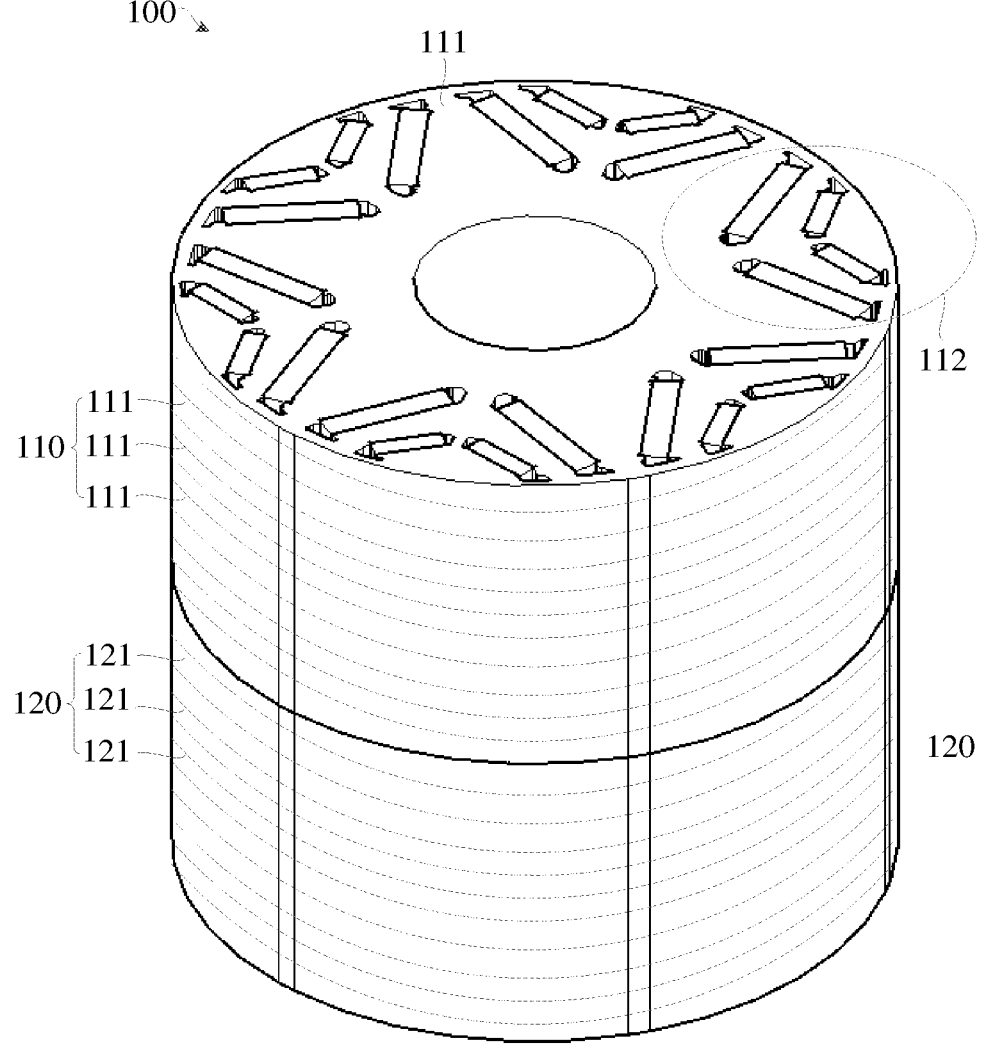
FIG. 1B is a schematic diagram of an overall structure of a rotor according to an embodiment of this application.

Specifically, as shown in FIG. 1B, the first rotor assembly 110 may include at least a plurality of first rotor laminations 111 stacked in an axial direction of the rotor 100. The first rotor laminations 111 in the first rotor assembly 110 are the same. Each first rotor lamination 111 is provided with a plurality of first permanent magnet slot groups 112. The first rotor lamination 111 is in a ring shape. The plurality of first permanent magnet slot groups 112 are evenly arranged in a circumferential direction of each first rotor lamination 111.

The second rotor assembly 120 may include at least a plurality of second rotor laminations 121 stacked in the axial direction of the rotor 100. The second rotor laminations 121 in the second rotor assembly 120 are the same. Each second rotor lamination 121 is provided with a plurality of second permanent magnet slot groups 122. The second rotor lamination 121 is in a ring shape. The plurality of second permanent magnet slot groups 122 are evenly arranged in a circumferential direction of each second rotor lamination 121.

Figure 2:
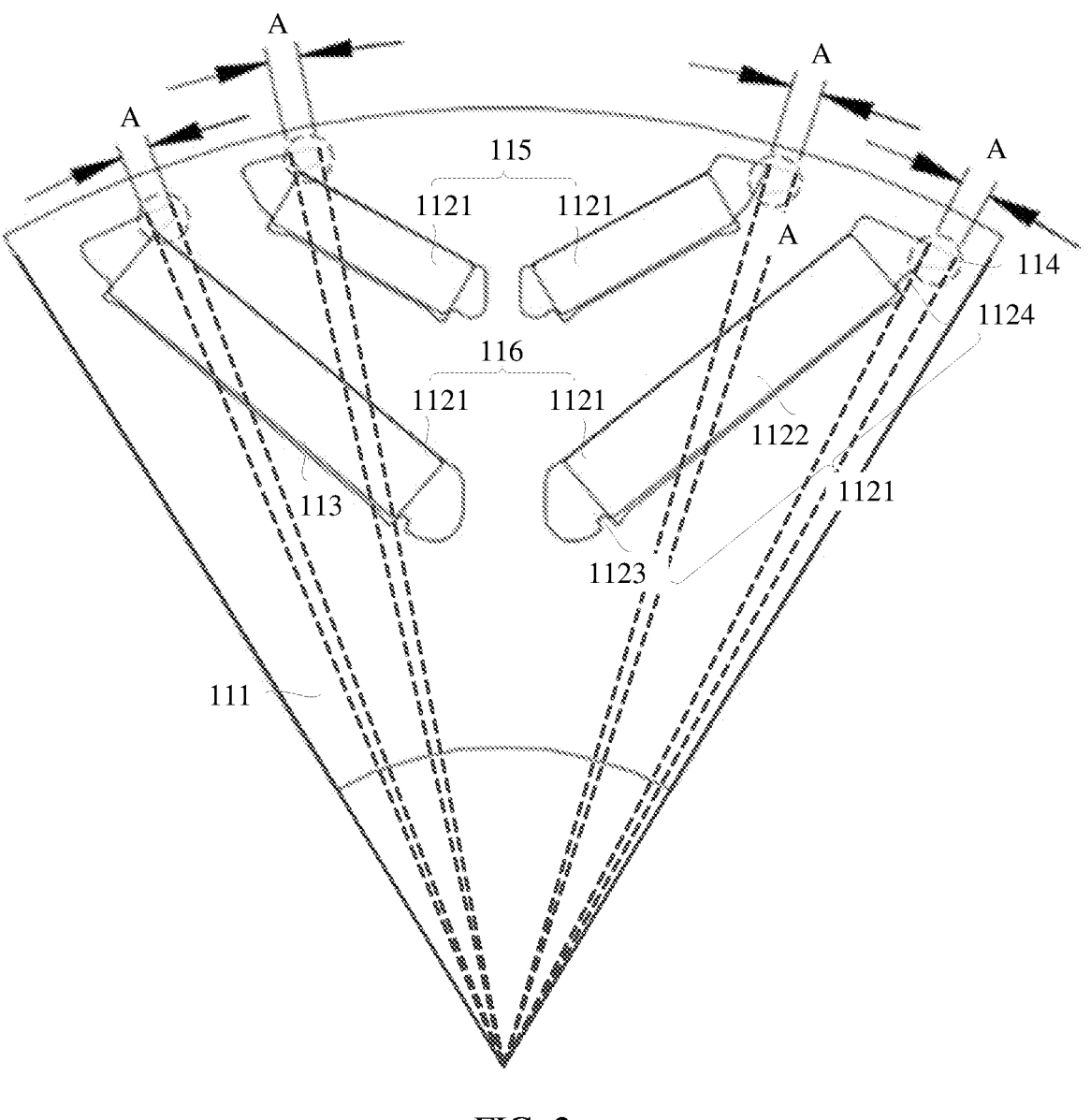
FIG. 2 is a schematic diagram of a partial structure of a first rotor lamination in a first rotor assembly of a rotor according to an embodiment of this application.

As shown in FIG. 2, each first permanent magnet slot group 112 may include at least one first permanent magnet slot 1121. A first permanent magnet 113 is disposed in each first permanent magnet slot 1121. A first boss 114 is disposed at one end that is of each first permanent magnet slot 1121 and that is close to an outer edge of the first rotor lamination 111.

Figure 3:
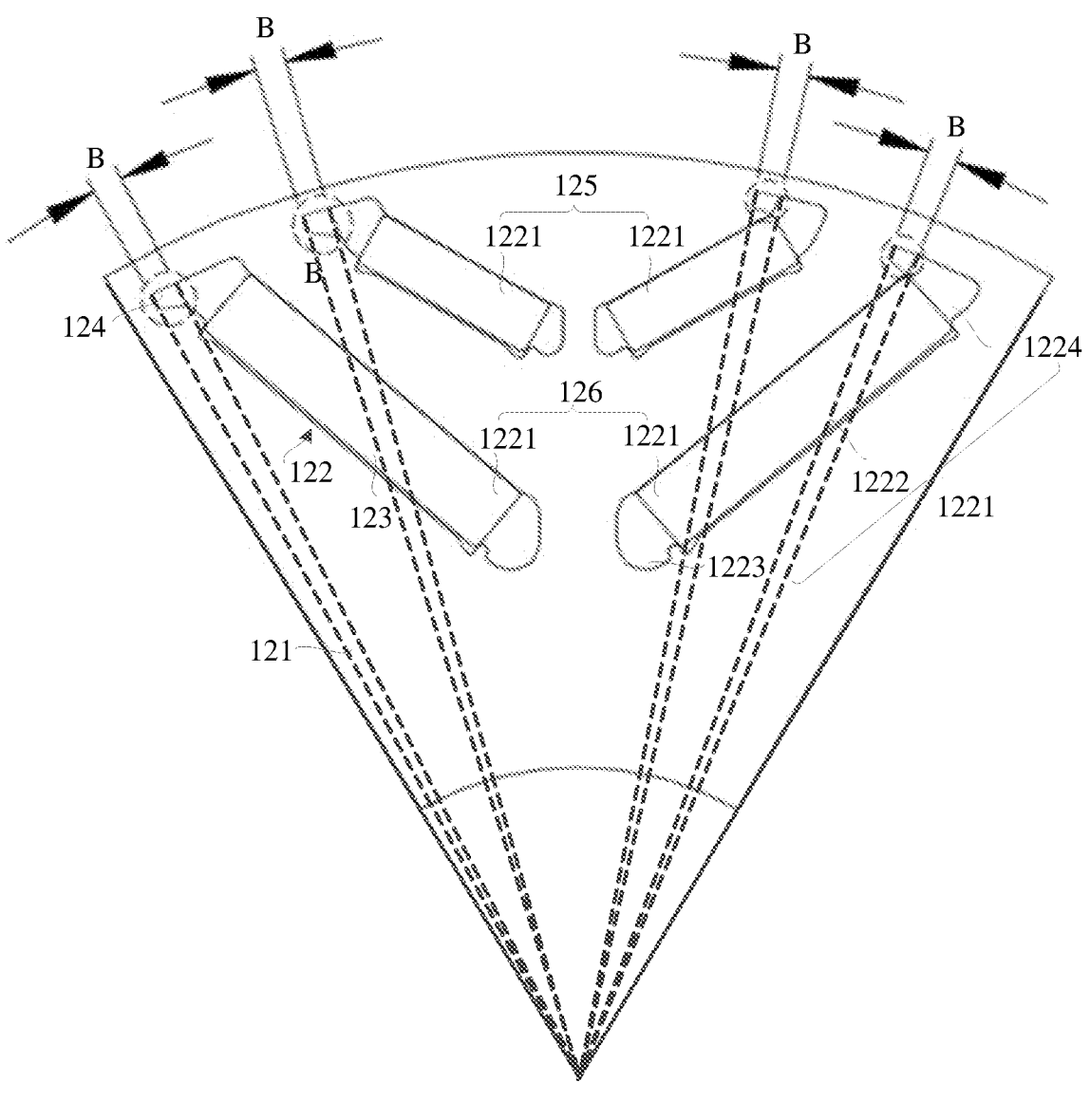
FIG. 3 is a schematic diagram of a partial structure of a second rotor lamination in a second rotor assembly of a rotor according to an embodiment of this application.

As shown in FIG. 3, each second permanent magnet slot group 122 may include at least one second permanent magnet slot 1221. A second permanent magnet 123 is disposed in each second permanent magnet slot 1221. A second boss 124 is disposed at one end that is of each second permanent magnet slot 1221 and that is close to an outer edge of the second rotor lamination 121.

In the axial direction of the rotor 100, the first permanent magnet slot 1121 and the second permanent magnet slot 1221 that are in a same corresponding location communicate with each other. The first permanent magnet slot and the second permanent magnet slot communicate with each other in the axial direction of the rotor, so that injection molding pressure of the rotor 100 in a manufacturing process can be greatly reduced.

It is easy to understand that, that the first permanent magnet slot 1121 and the second permanent magnet slot 1221 communicate with each other means that in the same corresponding location in the axial direction of the rotor 100, a projection region of the first permanent magnet slot 1121 in the axial direction of the rotor 100 and a projection region of the second permanent magnet slot 1221 in the axial direction of the rotor 100 at least partially overlap. At least partially overlapping means that the projection region of the first permanent magnet slot 1121 in the axial direction of the rotor 100 and the projection region of the second permanent magnet slot 1221 in the axial direction of the rotor 100 may completely overlap. In this case, an outer profile of the projection region of the first permanent magnet slot 1121 in the axial direction of the rotor 100 is the same as an outer profile of the projection region of the second permanent magnet slot 1221 in the axial direction of the rotor 100. Alternatively, the projection region of the first permanent magnet slot 1121 in the axial direction of the rotor 100 and the projection region of the second permanent magnet slot 1221 in the axial direction of the rotor 100 may only partially overlap, and other parts do not overlap, provided that the first permanent magnet slot 1121 and the second permanent magnet slot 1221 that are in the same corresponding location in the axial direction of the rotor 100 can communicate with each other.

In addition, it should be noted that, in this embodiment of this application, the axial direction of the rotor 100 is a direction along a central axis of the rotor 100, the circumferential direction of the first rotor lamination 111 is a direction along an outer circumferential wall of the first rotor lamination 111, and the circumferential direction of the second rotor lamination 121 is a direction along an outer circumferential wall of the second rotor lamination 121.

Figure 4:
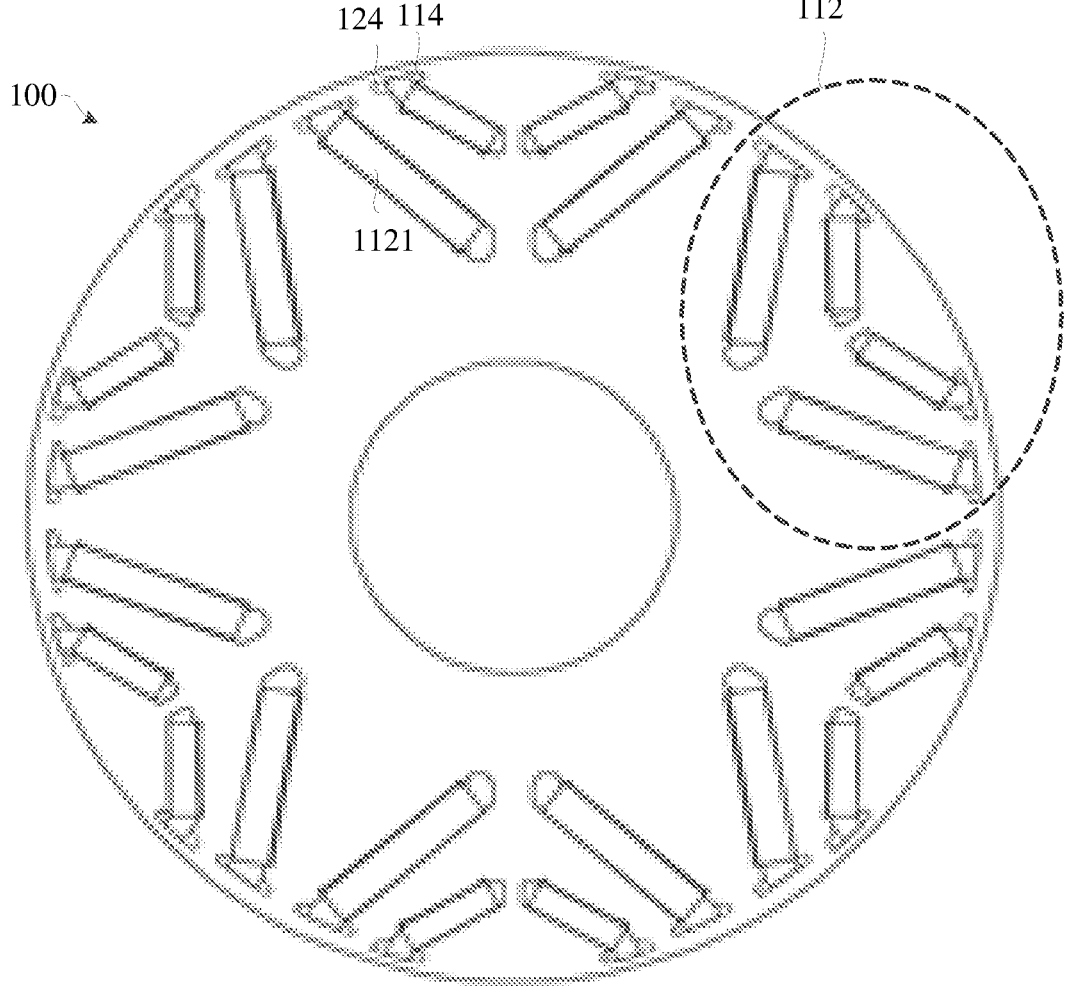
FIG. 4 is a perspective view of a first rotor assembly and a second rotor assembly of a rotor in an axial direction of the rotor according to an embodiment of this application.

In this embodiment of this application, as shown in FIG. 4, in the same corresponding location in the axial direction of the rotor 100, one end of the first boss 114 is connected to the first permanent magnet slot 1121, the other end of the first boss 114 extends in a clockwise direction of the first rotor lamination 111, one end of the second boss 124 is connected to the second permanent magnet slot 1221, and the other end of the second boss 124 extends in an anti-clockwise direction of the second rotor lamination 121.

In other words, the first boss 114 extends in the clockwise direction of the first rotor lamination 111 relative to the first permanent magnet slot 1121, and the second boss 124 extends in the anticlockwise direction of the second rotor lamination 121 relative to the second permanent magnet slot 1221. In this way, an overall structure of the first rotor lamination 111 has rotational symmetry, an overall structure of the second rotor lamination 121 also has rotational symmetry, and the first boss 114 and the second boss 124 extend in opposite directions, so that a magnetic field offset between the first rotor assembly 110 and the second rotor assembly 120 can be implemented, and a torque between the first rotor assembly 110 and the second rotor assembly 120 can be reduced. Therefore, NVH performance of the permanent magnet motor can be optimized.

Alternatively, in some embodiments, in the same corresponding location in the axial direction of the rotor 100, one end of the first boss 114 is connected to the first permanent magnet slot 1121, the other end of the first boss 114 extends in an anticlockwise direction of the first rotor lamination 111, one end of the second boss 124 is connected to the second permanent magnet slot 1221, and the other end of the second boss 124 extends in a clockwise direction of the second rotor lamination 121.

In other words, the first boss 114 extends in the anticlockwise direction of the first rotor lamination 111 relative to the first permanent magnet slot 1121, and the second boss 124 extends in the clockwise direction of the second rotor lamination 121 relative to the second permanent magnet slot 1221. In this way, the first boss 114 and the second boss 124 extend in opposite directions, so that a magnetic field offset between the first rotor assembly 110 and the second rotor assembly 120 can be implemented, and a torque between the first rotor assembly 110 and the second rotor assembly 120 can be reduced. Therefore, NVH performance of the permanent magnet motor can be optimized.

In this embodiment of this application, in the same corresponding location in the axial direction of the rotor 100, a central angle of the first boss 114 (namely, a first preset included angle A in FIG. 2) may be the same as a central angle of the second boss 124 (namely, a second preset included angle B in FIG. 3).

The central angle is specifically described herein. The central angle (namely, the first preset included angle A) of the first boss 114 in FIG. 2 is used as an example. The central angle of the first boss 114 is an included angle formed by connection lines between two ends of an outer arc edge of the first boss 114 and a center of the first rotor lamination 111. It is easy to understand that the outer arc edge of the first boss 114 is an edge that is of the first boss 114 and that is close to the outer edge of the first rotor lamination 111.

It should be noted that, that the central angle of the first boss 114 is the same as the central angle of the second boss 124 means that the two angles are the same in a mathematical sense, and a deviation is allowed during actual manufacturing or process implementation.

When the central angle of the first boss 114 of the first rotor lamination 111 corresponds to the central angle of the second boss 124 of the second rotor lamination 121, a problem of inconsistency between forward rotation performance and reversal rotation performance of the rotor 100 can be avoided, so that a problem of inconsistency between forward rotation performance and reversal rotation performance of the permanent magnet motor in a working process can be avoided, and overall reliability of the permanent magnet motor can be improved or ensured.

As shown in FIG. 2, in this embodiment of this application, each first permanent magnet slot 1121 may include a first main slot body 1122, a first flux barrier 1123, and a second flux barrier 1124. One end of the first main slot body 1122 is connected to the first flux barrier 1123. The other end of the first main slot body 1122 is connected to the second flux barrier 1124. The first main slot body 1122 is configured to accommodate the first permanent magnet 113. The first boss 114 is disposed at one end that is of the second flux barrier 1124 and that is close to the outer edge of the first rotor lamination 111.

As shown in FIG. 3, each second permanent magnet slot 1221 may include a second main slot body 1222, a third flux barrier 1223, and a fourth flux barrier 1224. One end of the second main slot body 1222 is connected to the third flux barrier 1223. The other end of the second main slot body 1222 is connected to the fourth flux barrier 1224. The second main slot body 1222 is configured to accommodate the second permanent magnet 123. The second boss 124 is disposed at one end that is of the fourth flux barrier 1224 and that is close to the outer edge of the second rotor lamination 121.

An orthographic projection of the first main slot body 1122 in the axial direction of the rotor 100 and an orthographic projection of the second main slot body 1222 in the axial direction of the rotor 100 may overlap with each other.

The first permanent magnet slot 1121 in the first rotor lamination 111 may be designed to include the first main slot body 1122, the first flux barrier 1123, and the second flux barrier 1124 that are connected to one another. The second permanent magnet slot 1221 in the second rotor lamination 121 may be designed to include the second main slot body 1222, the third flux barrier 1223, and the fourth flux barrier 1224 that are connected to one another. The first main slot body 1122 is configured to accommodate the first permanent magnet 113. The second main slot body 1222 is configured to accommodate the second permanent magnet 123. The orthographic projection of the first main slot body 1122 in the axial direction of the rotor 100 and the orthographic projection of the second main slot body 1222 in the axial direction of the rotor 100 overlap with each other. Therefore, it can be ensured that an orthographic projection of the first permanent magnet 113 in the axial direction of the rotor 100 and an orthographic projection of the second permanent magnet 123 in the axial direction of the rotor 100 overlap with each other. Locations of permanent magnets that correspond in the axial direction of the rotor 100 are consistent, so that magnetic steel insertion and magnetizing processes can be smoothly implemented.

In addition, the first flux barrier 1123 and the third flux barrier 1223 may communicate with each other in the axial direction of the rotor 100, and the second flux barrier 1124 and the fourth flux barrier 1224 may communicate with each other in the axial direction of the rotor 100. Therefore, it can be ensured that a tail end of the first permanent magnet slot 1121 and a tail end of the second permanent magnet slot 1221 keep communicating with each other in the axial direction of the rotor 100, so that injection molding pressure of the rotor 100 can be greatly reduced.

In this embodiment of this application, the first permanent magnet 113 and the second permanent magnet 123 that correspond to each other in the axial direction of the rotor 100 are the same. The first permanent magnet 113 and the second permanent magnet 123 that are corresponding to each other in the axial direction of the rotor 100 are the same. For example, the first permanent magnet 113 and the second permanent magnet 123 are consistent in size and material, so that magnetic steel materials can be centralizedly managed, and magnetic steel insertion and magnetizing processes are smoothly implemented.

It should be noted that, in this embodiment of this application, a specific disposition manner of each first permanent magnet slot group 112 and each second permanent magnet slot group 122 may include but is not limited to the following possible implementations.

Figure 5:
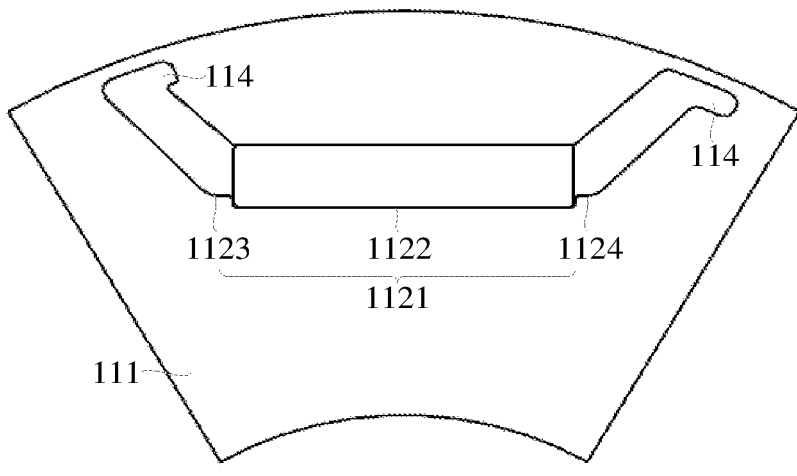
FIG. 5 is a schematic diagram of a partial structure of a first rotor lamination in a first rotor assembly of a rotor according to an embodiment of this application.
Figure 6:
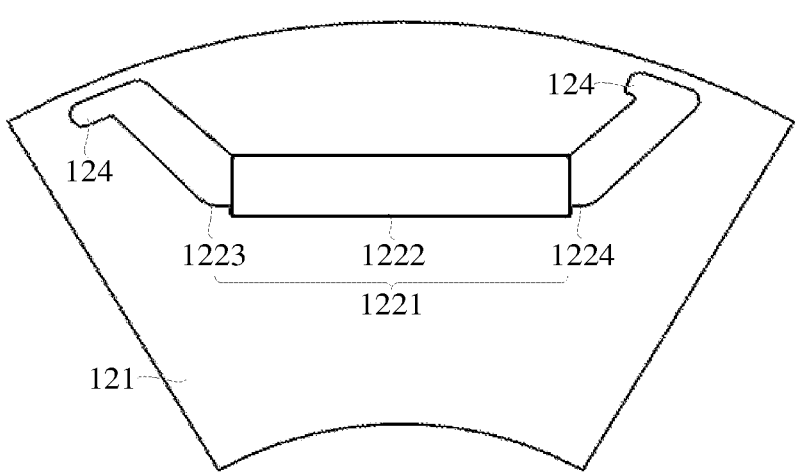
FIG. 6 is a schematic diagram of a partial structure of a second rotor lamination in a second rotor assembly of a rotor according to an embodiment of this application.

In a first possible implementation, each first permanent magnet slot group 112 may include one first permanent magnet slot 1121 (as shown in FIG. 5). A plurality of first permanent magnet slots 1121 in the plurality of first permanent magnet slot groups 112 are evenly arranged in a circumferential direction of the first rotor lamination 111. Each second permanent magnet slot group 122 may include one second permanent magnet slot 1221 (as shown in FIG. 6). A plurality of second permanent magnet slots 1221 in the plurality of second permanent magnet slot groups 122 are evenly arranged in a circumferential direction of the second rotor lamination 121.

Figure 7:
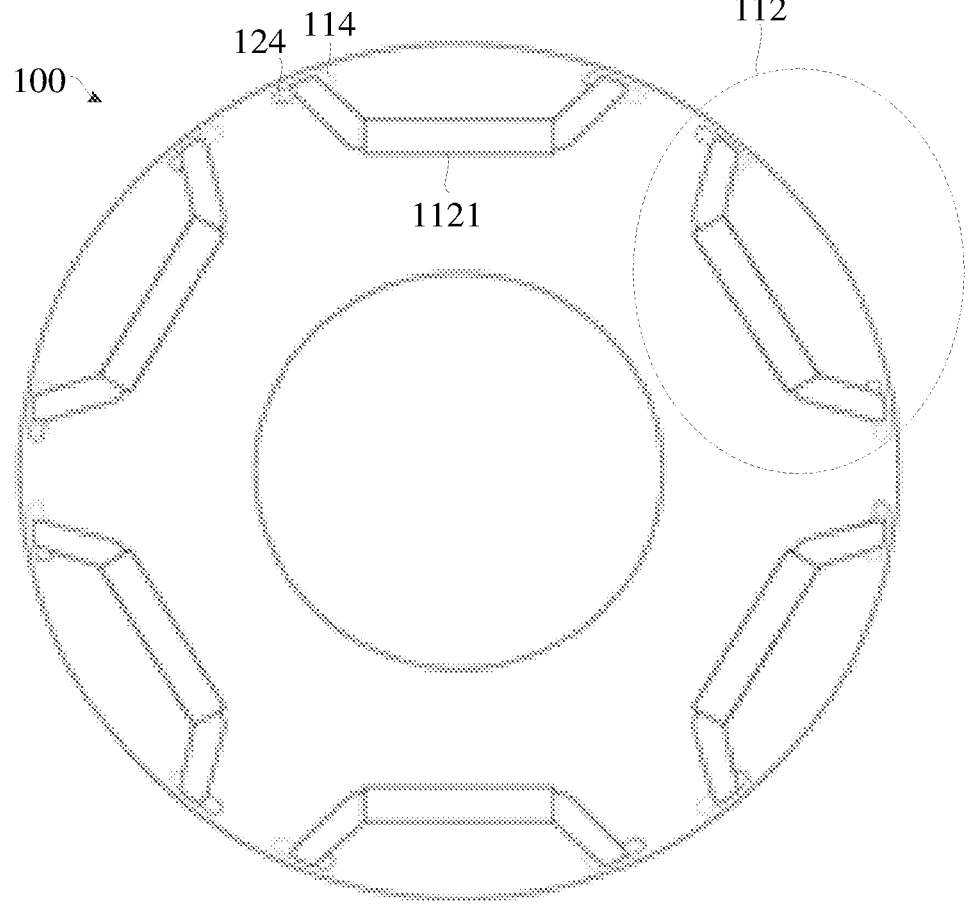
FIG. 7 is a perspective view of a first rotor assembly and a second rotor assembly of a rotor in an axial direction of the rotor according to an embodiment of this application.

In this case, as shown in FIG. 7, in the same corresponding location in the axial direction of the rotor 100, one end of the first boss 114 is connected to the first permanent magnet slot 1121, the other end of the first boss 114 extends in the clockwise direction of the first rotor lamination 111, one end of the second boss 124 is connected to the second permanent magnet slot 1221, and the other end of the second boss 124 extends in the anticlockwise direction of the second rotor lamination 121.

In a second possible implementation, each first permanent magnet slot group 112 may include two first permanent magnet slots 1121. The two first permanent magnet slots 1121 are symmetrically distributed in a radial direction of the first rotor lamination 111. Each second permanent magnet slot group 122 may include two second permanent magnet slots 1221. The two second permanent magnet slots 1221 are symmetrically distributed in a radial direction of the second rotor lamination 121.

It should be noted that, in this embodiment of this application, the radial direction of the first rotor lamination 111 is a direction along a diameter of the first rotor lamination 111, and the radial direction of the second rotor lamination 121 is a direction along a diameter of the second rotor lamination 121.

In this embodiment of this application, the two first permanent magnet slots 1121 may be distributed in a V shape in the radial direction of the first rotor lamination 111. The two second permanent magnet slots 1221 may be distributed in a V shape in the radial direction of the second rotor lamination 121.

Specifically, one end of one of the two first permanent magnet slots 1121 is close to one end of the other of the two first permanent magnet slots 1121. The other end of one of the two first permanent magnet slots 1121 is far away from the other end of the other of the two first permanent magnet slots 1121. In addition, the first boss 114 may be disposed at one end that is of each of the two first permanent magnet slots 1121 and that is close to the outer edge of the first rotor lamination 111. In other words, the first boss 114 is located at one end that is of each of the two first permanent magnet slots 1121 and that is close to the outer edge of the first rotor lamination 111.

Similarly, one end of one of the two second permanent magnet slots 1221 is close to one end of the other of the two second permanent magnet slots 1221. The other end of one of the two second permanent magnet slots 1221 is far away from the other end of the other of the two second permanent magnet slots 1221. In addition, the second boss 124 may be disposed at one end that is of each of the two second permanent magnet slots 1221 and that is close to the outer edge of the second rotor lamination 121. In other words, the second boss 124 is located at one end that is of each of the two second permanent magnet slots 1221 and that is close to the outer edge of the second rotor lamination 121.

In a third possible implementation, each first permanent magnet slot group 112 may include three first permanent magnet slots 1121. Two of the three first permanent magnet slots 1121 may be symmetrically distributed in a radial direction of the first rotor lamination 111. The other one of the three first permanent magnet slots 1121 may be located between the two first permanent magnet slots 1121.

Each second permanent magnet slot group 122 may include three second permanent magnet slots 1221. Two of the three second permanent magnet slots 1221 may be symmetrically distributed in a radial direction of the second rotor lamination 121. The other one of the three second permanent magnet slots 1221 may be located between the two second permanent magnet slots 1221.

Specifically, two of the three first permanent magnet slots 1121 may be distributed in a V shape in the radial direction of the first rotor lamination 111. The other one of the three first permanent magnet slots 1121 may be located between the two first permanent magnet slots 1121. Two of the three second permanent magnet slots 1221 may be distributed in a V shape in the radial direction of the second rotor lamination 121. The other one of the three second permanent magnet slots 1221 may be located between the two second permanent magnet slots 1221.

In a fourth possible implementation, each first permanent magnet slot group 112 may include four first permanent magnet slots 1121. Two of the four first permanent magnet slots 1121 may be symmetrically distributed in a radial direction of the first rotor lamination 111. The other two of the four first permanent magnet slots 1121 may be symmetrically distributed in the radial direction of the first rotor lamination 111.

Each second permanent magnet slot group 122 may include four second permanent magnet slots 1221. Two of the four second permanent magnet slots 1221 may be symmetrically distributed in a radial direction of the second rotor lamination 121. The other two of the four second permanent magnet slots 1221 may be symmetrically distributed in the radial direction of the second rotor lamination 121.

As shown in FIG. 2, in this embodiment of this application, two of the four first permanent magnet slots 1121 may be distributed in a V shape in the radial direction of the first rotor lamination 111. The other two of the four first permanent magnet slots 1121 may be distributed in a V shape in the radial direction of the first rotor lamination 111.

Similarly, as shown in FIG. 3, two of the four second permanent magnet slots 1221 may be distributed in a V shape in the radial direction of the second rotor lamination 121. The other two of the four second permanent magnet slots 1221 may be distributed in a V shape in the radial direction of the second rotor lamination 121.

Specifically, in this embodiment of this application, two of the four first permanent magnet slots 1121 may be a first V-shaped slot group 115. One end of one first permanent magnet slot 1121 in the first V-shaped slot group 115 is close to one end of the other first permanent magnet slot 1121 in the first V-shaped slot group 115. The other end of one first permanent magnet slot 1121 in the two first V-shaped slot groups 115 is far away from the other end of the other first permanent magnet slot 1121 in the two first V-shaped slot groups 115. In addition, the first boss 114 is disposed at one end that is of each of the two first permanent magnet slots 1121 in the first V-shaped slot group 115 and that is close to the outer edge of the first rotor lamination 111. In other words, the first boss 114 is located at one end that is of each of the two first permanent magnet slots 1121 in the first V-shaped slot group 115 and that is close to the outer edge of the first rotor lamination 111.

The other two of the four first permanent magnet slots 1121 may be a second V-shaped slot group 116. One end of one first permanent magnet slot 1121 in the second V-shaped slot group 116 is close to one end of the other first permanent magnet slot 1121 in the second V-shaped slot group 116. The other end of one first permanent magnet slot 1121 in the two second V-shaped slot groups 116 is far away from the other end of the other first permanent magnet slot 1121 in the two second V-shaped slot groups 116. In addition, the first boss 114 is disposed at one end that is of each of the two first permanent magnet slots 1121 in the second V-shaped slot group 116 and that is close to the outer edge of the first rotor lamination 111. In other words, the first boss 114 is located at one end that is of each of the two first permanent magnet slots 1121 in the second V-shaped slot group 116 and that is close to the outer edge of the first rotor lamination 111.

Two of the four second permanent magnet slots 1221 may be a third V-shaped slot group 125. One end of one second permanent magnet slot 1221 in the third V-shaped slot group 125 is close to one end of the other second permanent magnet slot 1221 in the third V-shaped slot group 125. The other end of one second permanent magnet slot 1221 in the two third V-shaped slot groups 125 is far away from the other end of the second permanent magnet slot 1221 in the two third V-shaped slot groups 125. In addition, the second boss 124 is disposed at one end that is of each of the two second permanent magnet slots 1221 in the third V-shaped slot group 125 and that is close to the outer edge of the second rotor lamination 121. In other words, the second boss 124 is located at one end that is of each of the two second permanent magnet slots 1221 in the third V-shaped slot group 125 and that is close to the outer edge of the second rotor lamination 121.

The other two of the four second permanent magnet slots 1221 may be a fourth V-shaped slot group 126. One end of one second permanent magnet slot 1221 in the fourth V-shaped slot group 126 is close to one end of the other second permanent magnet slot 1221 in the fourth V-shaped slot group 126. The other end of one second permanent magnet slot 1221 in the two fourth V-shaped slot groups 126 is far away from the other end of the other second permanent magnet slot 1221 in the two fourth V-shaped slot groups 126. In addition, the second boss 124 is disposed at one end that is of each of the two second permanent magnet slots 1221 in the fourth V-shaped slot group 126 and that is close to the outer edge of the second rotor lamination 121. In other words, the second boss 124 is located at one end that is of each of the two second permanent magnet slots 1221 in the fourth V-shaped slot group 126 and that is close to the outer edge of the second rotor lamination 121.

Specifically, in this embodiment of this application, the first V-shaped slot group 115 may be located on an inner side of the second V-shaped slot group 116. The third V-shaped slot group 125 is located on an inner side of the fourth V-shaped slot group 126.

Figure 8A:
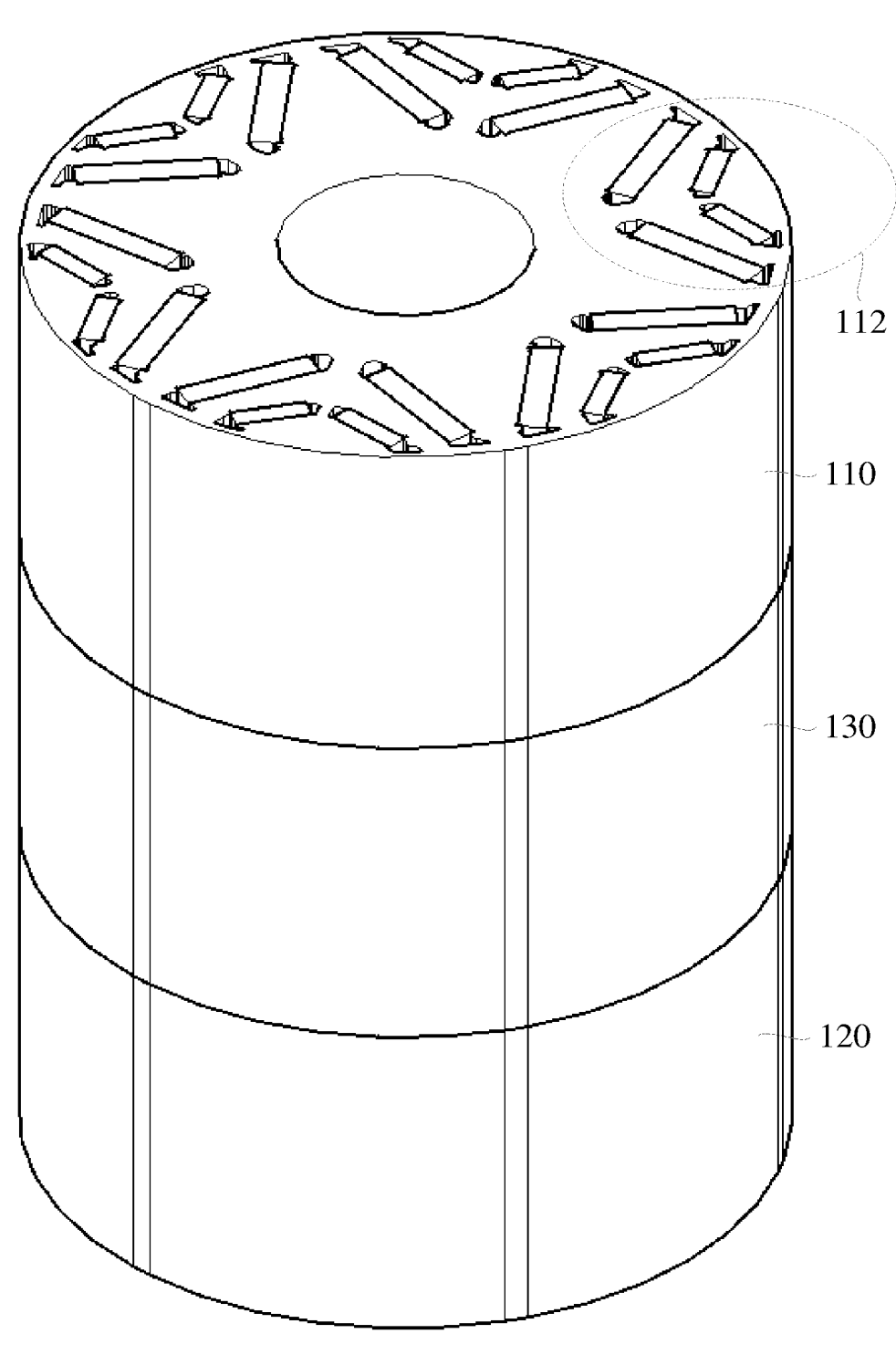
FIG. 8A is a schematic diagram of an overall structure of a rotor according to an embodiment of this application.

Based on the foregoing embodiment, the at least two rotor assemblies may further include a third rotor assembly 130 (as shown in FIG. 8A). The third rotor assembly 130 may be located between the first rotor assembly 110 and the second rotor assembly 120. In this case, there are three rotor assemblies in the rotor 100. One side of the third rotor assembly 130 is attached to the first rotor assembly 110. The other side of the third rotor assembly 130 is attached to the second rotor assembly 120.

Figure 8B:
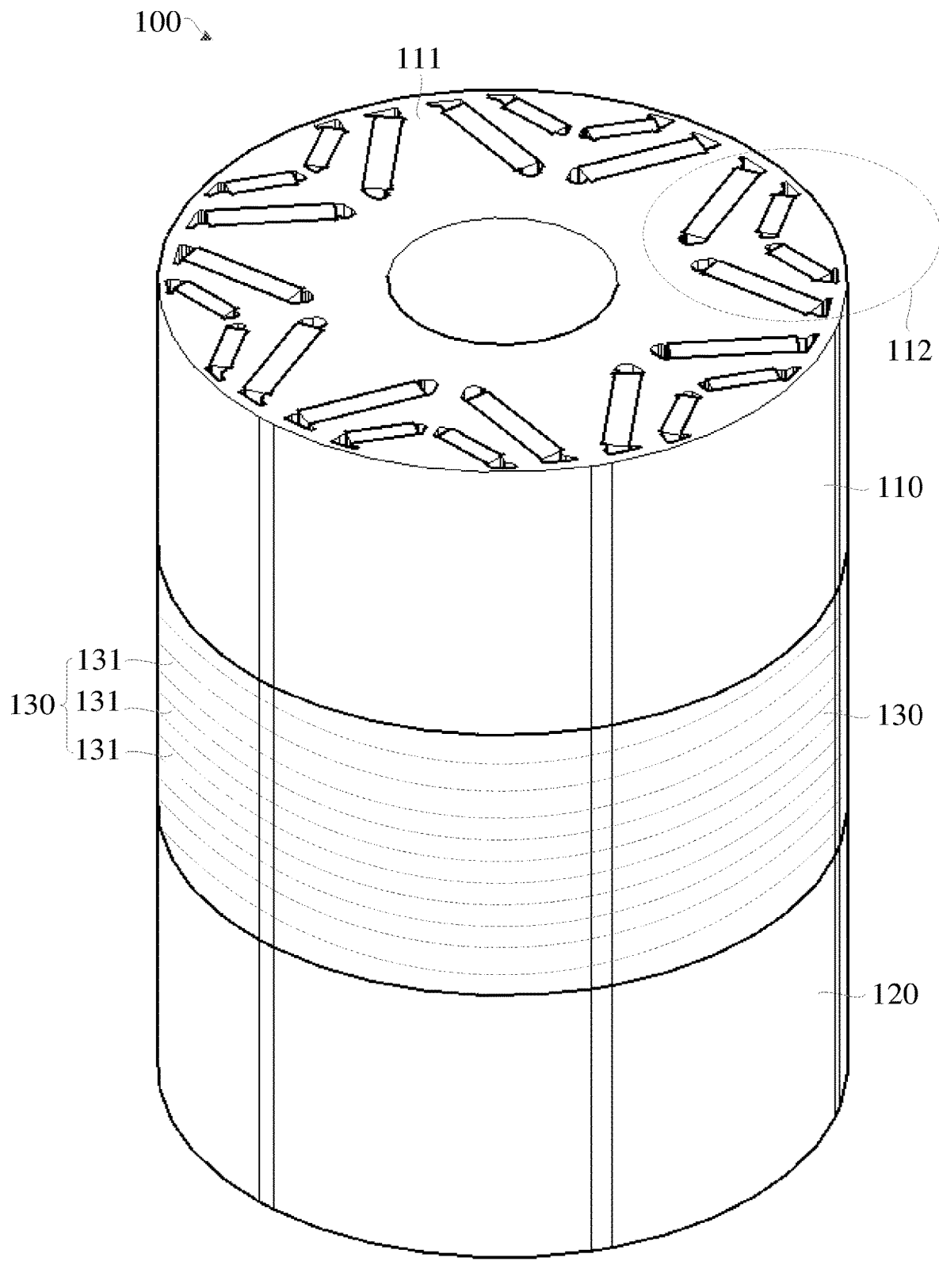
FIG. 8B is a schematic diagram of an overall structure of a rotor according to an embodiment of this application.

Specifically, as shown in FIG. 8B, the third rotor assembly 130 may include at least a plurality of third rotor laminations 131 stacked in the axial direction of the rotor 100. The third rotor laminations 131 in the third rotor assembly 130 are the same.

Figure 9:
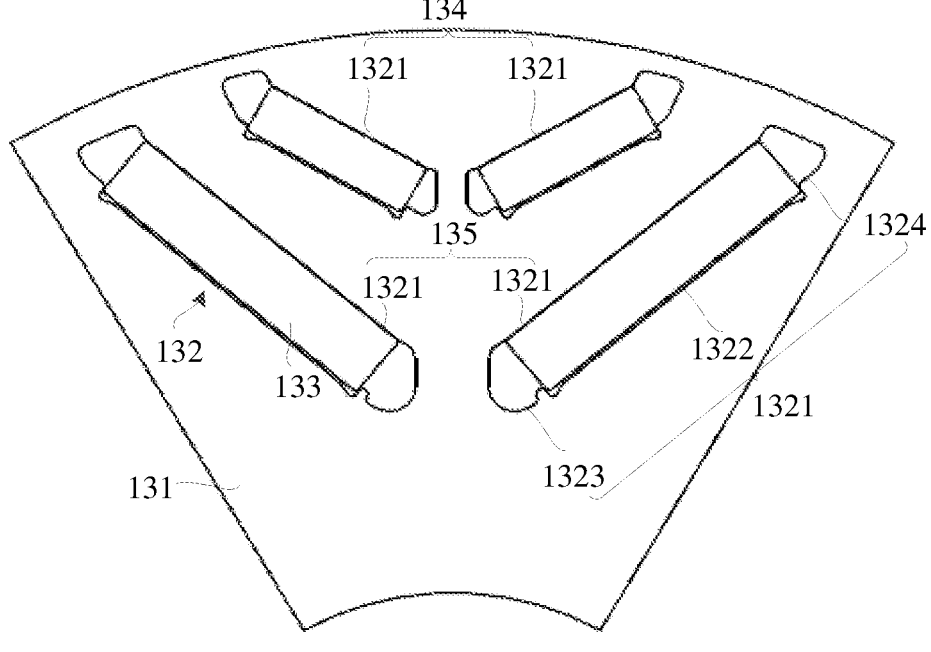
FIG. 9 is a schematic diagram of a partial structure of a third rotor lamination in a third rotor assembly of a rotor according to an embodiment of this application.

As shown in FIG. 9, each third rotor lamination 131 may be provided with a plurality of third permanent magnet slot groups 132. The plurality of third permanent magnet slot groups 132 are evenly arranged in a circumferential direction of each third rotor lamination 131. Each third permanent magnet slot group 132 may include at least one third permanent magnet slot 1321. A third permanent magnet 133 is disposed in each third permanent magnet slot 1321.

In the axial direction of the rotor 100, the third permanent magnet slot 1321, the first permanent magnet slot 1121, and the second permanent magnet slot 1221 that are in a same corresponding location communicate with one another.

It should be noted that, in this embodiment of this application, the circumferential direction of the third rotor lamination 131 is a direction along an outer circumferential wall of the first rotor lamination 111.

The third rotor assembly 130 is disposed in the rotor 100. The third rotor assembly 130 is disposed coaxial with the first rotor assembly 110 and the second rotor assembly 120. The third rotor assembly 130 may include at least a plurality of third rotor laminations 131 stacked in the axial direction of the rotor 100. Each third rotor lamination 131 is provided with a plurality of third permanent magnet slot groups 132 evenly arranged in a circumferential direction of the third rotor lamination 131. Each third permanent magnet slot group 132 may include at least one third permanent magnet slot 1321 configured to accommodate the third permanent magnet 133. In this way, a design dimension of the rotor 100 can be added based on the first rotor assembly 110 and the second rotor assembly 120.

As shown in FIG. 9 and FIG. 10, in this embodiment of this application, each third permanent magnet slot 1321 may include a third main slot body 1322, a fifth flux barrier 1323, and a sixth flux barrier 1324. One end of the third main slot body 1322 is connected to the fifth flux barrier 1323. The other end of the third main slot body 1322 is connected to the sixth flux barrier 1324. The third main slot body 1322 is configured to accommodate the third permanent magnet 133.

An orthographic projection of the third main slot body 1322 in the axial direction of the rotor 100, the orthographic projection of the first main slot body 1122 in the axial direction of the rotor 100, and the orthographic projection of the second main slot body 1222 in the axial direction of the rotor 100 overlap with one another. The third permanent magnet slot 1321 in the third rotor lamination 131 is designed to include the third main slot body 1322, the fifth flux barrier 1323, and the sixth flux barrier 1324 that are connected to one another. The third main slot body 1322 is configured to accommodate the third permanent magnet 133. The orthographic projection of the third main slot body 1322 in the axial direction of the rotor 100, the orthographic projection of the first main slot body 1122 in the axial direction of the rotor 100, and the orthographic projection of the second main slot body 1222 in the axial direction of the rotor 100 overlap with one another. Therefore, it can be ensured that an orthographic projection of the third permanent magnet 133 in the axial direction of the rotor 100, an orthographic projection of the first permanent magnet 113 in the axial direction of the rotor 100, and an orthographic projection of the second permanent magnet 123 in the axial direction of the rotor 100 overlap with one another. Locations of permanent magnets that correspond in the axial direction of the rotor 100 are consistent, so that magnetic steel insertion and magnetizing processes can be smoothly implemented.

In addition, the fifth flux barrier 1323, the first flux barrier 1123, and the third flux barrier 1223 may communicate with one another in the axial direction of the rotor 100, and the sixth flux barrier 1324, the second flux barrier 1124, and the fourth flux barrier 1224 may communicate with one another in the axial direction of the rotor 100. Therefore, it can be ensured that a tail end of the third permanent magnet slot 1321, a tail end of the first permanent magnet slot 1121, and a tail end of the second permanent magnet slot 1221 keep communicating with one another in the axial direction of the rotor 100, so that injection molding pressure of the rotor 100 can be greatly reduced.

It should be noted that, in this embodiment of this application, the first permanent magnet 113, the second permanent magnet 123, and the third permanent magnet 133 that correspond to one another in the axial direction of the rotor 100 are the same. The first permanent magnet 113, the second permanent magnet 123, and the third permanent magnet 133 that are corresponding to one another in the axial direction of the rotor 100 are the same. For example, the first permanent magnet 113, the second permanent magnet 123, and the third permanent magnet 133 are consistent in size and material, so that magnetic steel materials can be centralizedly managed, and magnetic steel insertion and magnetizing processes are smoothly implemented.

It may be understood that, in this embodiment of this application, a specific disposition manner of each third permanent magnet slot group 132 may include but is not limited to the following possible implementations.

In a first possible implementation, each third permanent magnet slot group 132 may include one third permanent magnet slot 1321 (as shown in FIG. 10). A plurality of third permanent magnet slots 1321 in the plurality of third permanent magnet slot groups 132 may be evenly arranged in the circumferential direction of the third rotor lamination 131.

In a second possible implementation, each third permanent magnet slot group 132 may include two third permanent magnet slots 1321. The two third permanent magnet slots 1321 may be symmetrically distributed in a radial direction of the third rotor lamination 131.

It should be noted that, in this embodiment of this application, the radial direction of the third rotor lamination 131 is a direction along a diameter of the third rotor lamination 131.

In this embodiment of this application, the two third permanent magnet slots 1321 may be distributed in a V shape in the radial direction of the third rotor lamination 131.

Specifically, one end of one of the two third permanent magnet slots 1321 is close to one end of the other of the two third permanent magnet slots 1321. The other end of one of the two third permanent magnet slots 1321 is far away from the other end of the other of the two third permanent magnet slots 1321.

In a third possible implementation, each first permanent magnet slot group 112 may include three third permanent magnet slots 1321. Two of the three third permanent magnet slots 1321 may be symmetrically distributed in the radial direction of the third rotor lamination 131. The other one of the three third permanent magnet slots 1321 may be located between the two third permanent magnet slots 1321.

Specifically, two of the three third permanent magnet slots 1321 may be distributed in a V shape in the radial direction of the third rotor lamination 131. The other one of the three third permanent magnet slots 1321 may be located between the two third permanent magnet slots 1321.

In a fourth possible implementation, each third permanent magnet slot group 132 may include four third permanent magnet slots 1321. Two of the four third permanent magnet slots 1321 may be symmetrically distributed in a radial direction of the third rotor lamination 131. The other two of the four third permanent magnet slots 1321 may be symmetrically distributed in the radial direction of the third rotor lamination 131.

As shown in FIG. 9, in this embodiment of this application, two of the four third permanent magnet slots 1321 may be distributed in a V shape in the radial direction of the third rotor lamination 131. The other two of the four third permanent magnet slots 1321 may be distributed in a V shape in the radial direction of the third rotor lamination 131.

Specifically, in this embodiment of this application, two of the four third permanent magnet slots 1321 may be a fifth V-shaped slot group 134. One end of one third permanent magnet slot 1321 in the fifth V-shaped slot group 134 is close to one end of the other third permanent magnet slot 1321 in the fifth V-shaped slot group 134. The other end of one third permanent magnet slot 1321 in the two fifth V-shaped slot groups 134 is far away from the other end of the other third permanent magnet slot 1321 in the two fifth V-shaped slot groups 134.

The other two of the four first permanent magnet slots 1121 may be a sixth V-shaped slot group 135. One end of one third permanent magnet slot 1321 in the sixth V-shaped slot group 135 is close to one end of the other third permanent magnet slot 1321 in the sixth V-shaped slot group 135. The other end of one third permanent magnet slot 1321 in the two sixth V-shaped slot groups 135 is far away from the other end of the other third permanent magnet slot 1321 in the two sixth V-shaped slot groups 135.

It should be noted that, in this embodiment of this application, the fifth V-shaped slot group 134 may be located on an inner side of the sixth V-shaped slot group 135.

It should be noted that, in this embodiment of this application, there may be four, five, six, or more rotor assemblies in the rotor 100. A specific quantity of disposed rotor assemblies may be flexibly set based on a requirement of an actual application scenario. This is not limited in this embodiment of this application.

For example, in this embodiment of this application, there may be four rotor assemblies in the rotor 100. On the basis that the rotor 100 includes the first rotor assembly 110 and the second rotor assembly 120, the rotor 100 may further include a fourth rotor assembly 140 and a fifth rotor assembly 150. The fourth rotor assembly 140 and the fifth rotor assembly 150 may be located between the first rotor assembly 110 and the second rotor assembly 120 (as shown in FIG. 11), or the first rotor assembly 110 and the second rotor assembly 120 may be located between the fourth rotor assembly 140 and the fifth rotor assembly 150, and the fourth rotor assembly 140 and the fifth rotor assembly 150 are disposed coaxial with the first rotor assembly 110 and the second rotor assembly 120. In this case, the fourth rotor assembly 140 may have a same structure as one of the first rotor assembly 110 and the second rotor assembly 120, and the fifth rotor assembly 150 may have a same structure as the other of the first rotor assembly 110 and the second rotor assembly 120.

Based on the foregoing embodiment, an embodiment of this application further provides a permanent magnet motor. The permanent magnet motor may include at least one stator structure (not shown in the figure) and at least one rotor 100 described above. The rotor 100 and the stator structure are alternately arranged in an axial direction of the permanent magnet motor.

According to the permanent magnet motor provided in this embodiment of this application, the permanent magnet motor may include the rotor 100. In the rotor 100, a first rotor assembly 110 and a second rotor assembly 120 use an axial combination structure. A magnetic field offset between the first rotor assembly 110 and the second rotor assembly 120 can be implemented by using first bosses 114 in first rotor laminations 111 and second bosses 124 in second rotor laminations 121, so that a torque between the first rotor assembly 110 and the second rotor assembly 120 is reduced. In this way, NVH performance of the permanent magnet motor can be optimized, a production process can be simplified, and therefore a problem that an overall process difficulty of the rotor 100 is high, and consequently production efficiency of the permanent magnet motor is low can be avoided. This can facilitate mass production of the rotor 100 and the permanent magnet motor.

The rotor 100 is disposed in the permanent magnet motor. Because a process difficulty of the rotor 100 in the permanent magnet motor is small, a process difficulty of the permanent magnet motor is small, and production efficiency is high. In this way, mass production of the permanent magnet motor can be improved, and use performance of the permanent magnet motor can be optimized.

In addition, it may be understood that, in this embodiment of this application, the permanent magnet motor may be a dual-rotor single-stator permanent magnet motor in which two rotors 100 may be respectively located on two sides of a stator structure.

An embodiment of this application further provides a powertrain. The powertrain may include at least the foregoing permanent magnet motor.

According to the powertrain provided in this embodiment of this application, the powertrain may include at least the permanent magnet motor. The permanent magnet motor may include at least the rotor 100. In the rotor 100, a first rotor assembly 110 and a second rotor assembly 120 use an axial combination structure. A magnetic field offset between the first rotor assembly 110 and the second rotor assembly 120 can be implemented by using first bosses 114 in first rotor laminations 111 and second bosses 124 in second rotor laminations 121, so that a torque between the first rotor assembly 110 and the second rotor assembly 120 is reduced. In this way, NVH performance of the permanent magnet motor can be optimized, a production process can be simplified, and therefore a problem that an overall process difficulty of the rotor 100 is high, and consequently production efficiency of the permanent magnet motor is low can be avoided. This can facilitate mass production of the rotor 100 and the permanent magnet motor.

The permanent magnet motor is disposed in the powertrain. Because a process difficulty of the rotor 100 in the permanent magnet motor is small, a process difficulty of the permanent magnet motor is small, and production efficiency is high. Therefore, overall performance of the powertrain can be optimized.

In addition, an embodiment of this application further provides a vehicle. The vehicle may include at least front wheels, rear wheels, a vehicle body, and the foregoing permanent magnet motor. The vehicle body may be connected between the front wheels and the rear wheels. The permanent magnet motor may be installed on the vehicle body.

It may be understood that the permanent magnet motor is configured to provide power for the vehicle. The permanent magnet motor in this application has a compact structure, high structural strength, a high torque density, and a high power density. The compact structure can reduce a size of the permanent magnet motor, and can reduce waste of internal space of the vehicle when being applied to the vehicle. The vehicle may include a car or the like. In another implementation, the vehicle may include an electric vehicle or a special operation vehicle. The electric vehicle may include a two-wheeled, three-wheeled, or four-wheeled electric vehicle. The special operation vehicle may include various vehicles with a specific function, for example, an engineering rescue vehicle, a sprinkler, a sewage truck, a cement mixer, a crane, or a medical vehicle.

According to the vehicle provided in this embodiment of this application, the vehicle may include at least the permanent magnet motor. The permanent magnet motor may include at least a rotor 100. In the rotor 100, a first rotor assembly 110 and a second rotor assembly 120 use an axial combination structure. A magnetic field offset between the first rotor assembly 110 and the second rotor assembly 120 can be implemented by using first bosses 114 in first rotor laminations 111 and second bosses 124 in second rotor laminations 121, so that a torque between the first rotor assembly 110 and the second rotor assembly 120 is reduced. In this way, NVH performance of the permanent magnet motor can be optimized, a production process can be simplified, and therefore a problem that an overall process difficulty of the rotor 100 is high, and consequently production efficiency of the permanent magnet motor is low can be avoided. This can facilitate mass production of the rotor 100 and the permanent magnet motor.

The permanent magnet motor is disposed in the vehicle. Because a process difficulty of the rotor 100 in the permanent magnet motor is low, a process difficulty of the permanent magnet motor is small, and production efficiency is high. Therefore, the vehicle has a small process difficulty and high production efficiency. In this way, use performance and safety of the vehicle can be optimized.

In descriptions of embodiments of this application, it should be noted that, unless otherwise clearly specified and limited, the terms "installation", "connection to", and "connection" should be understood in a broad sense. For example, the connection may be a fixed connection, may be an indirect connection by using an intermediate medium, or may be an internal connection between two elements or an interaction relationship between two elements. For persons of ordinary skill in the art, specific meanings of the foregoing terms in embodiments of this application may be understood based on a specific situation.

An apparatus or element in embodiments of this application or an implied apparatus or element needs to have a specific direction and be constructed and operated in a specific direction, and therefore cannot be construed as a limitation to embodiments of this application. In descriptions of embodiments of this application, the meaning of "a plurality of" is two or more, unless otherwise precisely and specifically specified.

In the specification, claims, and accompanying drawings in embodiments of this application, the terms "first", "second", "third", "fourth", and the like (if available) are intended to distinguish between similar objects but do not necessarily indicate a specific order or sequence. It should be understood that the data termed in such a way is interchangeable in proper circumstances so that embodiments of this application described herein can be implemented in an order other than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Finally, it should be noted that the foregoing embodiments are merely intended for describing the technical solutions of embodiments of this application other than limiting embodiments of this application. Although embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A rotor, comprising:

at least two rotor assemblies disposed coaxially, wherein:

the at least two rotor assemblies comprise a first rotor assembly and a second rotor assembly that is attached to the first rotor assembly;

the first rotor assembly comprises a plurality of first rotor laminations stacked in an axial direction of the rotor, wherein each of the plurality of first rotor laminations is in contact with at least one adjacent first rotor lamination, each first rotor lamination is provided with a plurality of first permanent magnet slot groups, and the plurality of first permanent magnet slot groups are evenly arranged in a circumferential direction of each first rotor lamination;

each first permanent magnet slot group comprises at least one first permanent magnet slot, a first permanent magnet is disposed in each first permanent magnet slot, and a first boss is disposed at one end that is of each first permanent magnet slot and that is closer to an outer edge of a first rotor lamination than a center of the first rotor lamination;

the second rotor assembly comprises a plurality of second rotor laminations stacked in the axial direction of the rotor, wherein each of the plurality of second rotor laminations is in contact with at least one adjacent second rotor lamination, each second rotor lamination is provided with a plurality of second permanent magnet slot groups, and the plurality of second permanent magnet slot groups are evenly arranged in a circumferential direction of each second rotor lamination;

each second permanent magnet slot group comprises at least one second permanent magnet slot, a second permanent magnet is disposed in each second permanent magnet slot, and a second boss is disposed at one end that is of each second permanent magnet slot and that is closer to an outer edge of a second rotor lamination than a center of the second rotor lamination; and in the axial direction of the rotor, each first permanent magnet slot of the at least one first permanent magnet slot and each second permanent magnet slot of the at least one second permanent magnet slot that are in a same corresponding location are communicatively coupled to each other.

2. The rotor according to claim 1, wherein:

in the same corresponding location in the axial direction of the rotor, one end of a first boss is connected to the first permanent magnet slot, the other end of the first boss extends in a clockwise direction of a first rotor lamination, one end of a second boss is connected to the second permanent magnet slot, and the other end of the second boss extends in an anticlockwise direction of a second rotor lamination; or in the same corresponding location in the axial direction of the rotor, one end of the first boss is connected to the first permanent magnet slot, the other end of the first boss extends in an anticlockwise direction of the first rotor lamination, one end of the second boss is connected to the second permanent magnet slot, and the other end of the second boss extends in a clockwise direction of the second rotor lamination.

3. The rotor according to claim 1, wherein in the same corresponding location in the axial direction of the rotor, a central angle of a first boss is the same as a central angle of a second boss.

4. The rotor according to claim 1, wherein:

each first permanent magnet slot comprises a first main slot body, a first flux barrier, and a second flux barrier, one end of the first main slot body is connected to the first flux barrier, the other end of the first main slot body is connected to the second flux barrier, the first main slot body is configured to accommodate the first permanent magnet, and the first boss is disposed at one end that is of the second flux barrier and that is closer to an outer edge of a first rotor lamination than a center of the first rotor lamination;

each second permanent magnet slot comprises a second main slot body, a third flux barrier, and a fourth flux barrier, one end of the second main slot body is connected to the third flux barrier, the other end of the second main slot body is connected to the fourth flux barrier, the second main slot body is configured to accommodate the second permanent magnet, and the second boss is disposed at one end that is of the fourth flux barrier and that is closer to an outer edge of a second rotor lamination than a center of the second rotor lamination; and the first flux barrier and the third flux barrier are communicatively coupled to each other in the axial direction of the rotor, and the second flux barrier and the fourth flux barrier are communicatively coupled to each other in the axial direction of the rotor.

5. The rotor according to claim 4, wherein:

the at least two rotor assemblies further comprise a third rotor assembly, the third rotor assembly is located between the first rotor assembly and the second rotor assembly, and the third rotor assembly is attached to the first rotor assembly and the second rotor assembly;

the third rotor assembly comprises at least a plurality of third rotor laminations stacked in the axial direction of the rotor, each third rotor lamination is provided with a plurality of third permanent magnet slot groups, and the plurality of third permanent magnet slot groups are evenly arranged in a circumferential direction of each third rotor lamination;

each third permanent magnet slot group comprises at least one third permanent magnet slot, and a third permanent magnet is disposed in each third permanent magnet slot; and in the axial direction of the rotor, a third permanent magnet slot, a first permanent magnet slot, and a second permanent magnet slot that are in a same corresponding location are communicatively coupled to one another.

6. The rotor according to claim 5, wherein:

each third permanent magnet slot comprises a third main slot body, a fifth flux barrier, and a sixth flux barrier, one end of the third main slot body is connected to the fifth flux barrier, the other end of the third main slot body is connected to the sixth flux barrier, and the third main slot body is configured to accommodate a third permanent magnet; and the fifth flux barrier, the first flux barrier, and the third flux barrier are communicatively coupled to one another in the axial direction of the rotor, and the sixth flux barrier, the second flux barrier, and the fourth flux barrier communicatively coupled to one another in the axial direction of the rotor.

7. The rotor according to claim 5, wherein each third permanent magnet slot group comprises one third permanent magnet slot, and a plurality of third permanent magnet slots in a plurality of third permanent magnet slot groups are evenly arranged in the circumferential direction of a third rotor lamination.

8. The rotor according to claim 5, wherein each third permanent magnet slot group comprises two third permanent magnet slots, and the two third permanent magnet slots are distributed in a V shape in a radial direction of a third rotor lamination.

9. The rotor according to claim 5, wherein:

each first permanent magnet slot group comprises three third permanent magnet slots; and two of the three third permanent magnet slots are distributed in a V shape in a radial direction of a third rotor lamination, and the other one of the three third permanent magnet slots is located between the two third permanent magnet slots.

10. The rotor according to claim 5, wherein:

each third permanent magnet slot group comprises four third permanent magnet slots;

two of the four third permanent magnet slots are a fifth V-shaped slot group, the fifth V-shaped slot group is distributed in a V shape in a radial direction of a third rotor lamination, the other two of the four third permanent magnet slots are a sixth V-shaped slot group, and the sixth V-shaped slot group is distributed in a V shape in the radial direction of the third rotor lamination; and the fifth V-shaped slot group is located on an inner side of the sixth V-shaped slot group.

11. The rotor according to claim 5, wherein the third permanent magnet, the first permanent magnet, and the second permanent magnet that correspond to one another in the axial direction of the rotor are the same.

12. The rotor according to claim 1, wherein:

each first permanent magnet slot group comprises one first permanent magnet slot, and a plurality of first permanent magnet slots in a plurality of first permanent magnet slot groups are evenly arranged in the circumferential direction of a first rotor lamination; and each second permanent magnet slot group comprises one second permanent magnet slot, and a plurality of second permanent magnet slots in a plurality of second permanent magnet slot groups are evenly arranged in the circumferential direction of a second rotor lamination.

13. The rotor according to claim 1, wherein:

each first permanent magnet slot group comprises two first permanent magnet slots, and the two first permanent magnet slots are distributed in a V shape in a radial direction of a first rotor lamination; and each second permanent magnet slot group comprises two second permanent magnet slots, and the two second permanent magnet slots are distributed in a V shape in a radial direction of a second rotor lamination.

14. The rotor according to claim 1, wherein:

each first permanent magnet slot group comprises three first permanent magnet slots;

two of the three first permanent magnet slots are distributed in a V shape in a radial direction of a first rotor lamination, and the other one of the three first permanent magnet slots is located between the two first permanent magnet slots;

each second permanent magnet slot group comprises three second permanent magnet slots; and two of the three second permanent magnet slots are distributed in a V shape in a radial direction of a second rotor lamination, and the other one of the three second permanent magnet slots is located between the two second permanent magnet slots.

15. The rotor according to claim 1, wherein:

each first permanent magnet slot group comprises four first permanent magnet slots;

two of the four first permanent magnet slots are a first V-shaped slot group, the first V-shaped slot group is distributed in a V shape in a radial direction of a first rotor lamination, the other two of the four first permanent magnet slots are a second V-shaped slot group, the second V-shaped slot group is distributed in a V shape in the radial direction of the first rotor lamination, and the first V-shaped slot group is located on an inner side of the second V-shaped slot group; and each second permanent magnet slot group comprises four second permanent magnet slots, two of the four second permanent magnet slots are a third V-shaped slot group, the third V-shaped slot group is distributed in a V shape in a radial direction of a second rotor lamination, the other two of the four second permanent magnet slots are a fourth V-shaped slot group, the fourth V-shaped slot group is distributed in a V shape in the radial direction of the second rotor lamination, and the third V-shaped slot group is located on an inner side of the fourth V-shaped slot group.

16. The rotor according to claim 1, wherein:

the first permanent magnet and the second permanent magnet that correspond to each other in the axial direction of the rotor are the same.

17. A permanent magnet motor, comprising at least one stator structure and at least one rotor, wherein a rotor of the at least one rotor comprises at least two rotor assemblies disposed coaxially, and wherein:

the at least two rotor assemblies comprise a first rotor assembly and a second rotor assembly that is attached to the first rotor assembly;

the first rotor assembly comprises a plurality of first rotor laminations stacked in an axial direction of the rotor, wherein each of the plurality of first rotor laminations is in contact with at least one adjacent first rotor lamination, each first rotor lamination is provided with a plurality of first permanent magnet slot groups, and the plurality of first permanent magnet slot groups are evenly arranged in a circumferential direction of each first rotor lamination;

each first permanent magnet slot group comprises at least one first permanent magnet slot, a first permanent magnet is disposed in each first permanent magnet slot, and a first boss is disposed at one end that is of each first permanent magnet slot and that is closer to an outer edge of a first rotor lamination than a center of the first rotor lamination;

the second rotor assembly comprises a plurality of second rotor laminations stacked in the axial direction of the rotor, wherein each of the plurality of second rotor laminations is in contact with at least one adjacent second rotor lamination, each second rotor lamination is provided with a plurality of second permanent magnet slot groups, and the plurality of second permanent magnet slot groups are evenly arranged in a circumferential direction of each second rotor lamination;

each second permanent magnet slot group comprises at least one second permanent magnet slot, a second permanent magnet is disposed in each second permanent magnet slot, and a second boss is disposed at one end that is of each second permanent magnet slot and that is closer to an outer edge of a second rotor lamination than a center of the second rotor lamination; and in the axial direction of the rotor, each first permanent magnet slot of the at least one first permanent magnet slot and each second permanent magnet slot of the at least one second permanent magnet slot that are in a same corresponding location are communicatively coupled to each other.

18. The permanent magnet motor according to claim 17, wherein:

in the same corresponding location in the axial direction of the rotor, one end of a first boss is connected to the first permanent magnet slot, the other end of the first boss extends in a clockwise direction of a first rotor lamination, one end of a second boss is connected to the second permanent magnet slot, and the other end of the second boss extends in an anticlockwise direction of a second rotor lamination; or in the same corresponding location in the axial direction of the rotor, one end of the first boss is connected to the first permanent magnet slot, the other end of the first boss extends in an anticlockwise direction of the first rotor lamination, one end of the second boss is connected to the second permanent magnet slot, and the other end of the second boss extends in a clockwise direction of the second rotor lamination.

19. The permanent magnet motor according to claim 17, wherein in the same corresponding location in the axial direction of the rotor, a central angle of a first boss is the same as a central angle of a second boss.

20. A powertrain, wherein the powertrain comprises a permanent magnet motor, wherein the permanent magnet motor comprises at least one stator structure and at least one rotor, wherein a rotor of the at least one rotor comprises at least two rotor assemblies disposed coaxially, and wherein:

the at least two rotor assemblies comprise a first rotor assembly and a second rotor assembly that is attached to the first rotor assembly;

the first rotor assembly comprises a plurality of first rotor laminations stacked in an axial direction of the rotor, wherein each of the plurality of first rotor laminations is in contact with at least one adjacent first rotor lamination, each first rotor lamination is provided with a plurality of first permanent magnet slot groups, and the plurality of first permanent magnet slot groups are evenly arranged in a circumferential direction of each first rotor lamination;

each first permanent magnet slot group comprises at least one first permanent magnet slot, a first permanent magnet is disposed in each first permanent magnet slot, and a first boss is disposed at one end that is of each first permanent magnet slot and that is closer to an outer edge of a first rotor lamination than a center of the first rotor lamination;

the second rotor assembly comprises a plurality of second rotor laminations stacked in the axial direction of the rotor, wherein each of the plurality of second rotor laminations is in contact with at least one adjacent second rotor lamination, each second rotor lamination is provided with a plurality of second permanent magnet slot groups, and the plurality of second permanent magnet slot groups are evenly arranged in a circumferential direction of each second rotor lamination;

each second permanent magnet slot group comprises at least one second permanent magnet slot, a second permanent magnet is disposed in each second permanent magnet slot, and a second boss is disposed at one end that is of each second permanent magnet slot and that is closer to an outer edge of a second rotor lamination than a center of the second rotor lamination; and in the axial direction of the rotor, each first permanent magnet slot of the at least one first permanent magnet slot and each second permanent magnet slot of the at least one second permanent magnet slot that are in a same corresponding location are communicatively coupled to each other.

* * * * *